United States Patent
Naganuma et al.

(10) Patent No.: US 8,918,585 B2
(45) Date of Patent: Dec. 23, 2014

(54) MANAGEMENT SYSTEM CALCULATING STORAGE CAPACITY TO BE INSTALLED/REMOVED

(75) Inventors: Yuki Naganuma, Yokohama (JP); Hirokazu Ikeda, Yamato (JP); Hironori Emaru, Yokohama (JP); Koichi Murayama, Kawasaki (JP); Shinichiro Kanno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 12/742,733

(22) PCT Filed: Jan. 28, 2010

(86) PCT No.: PCT/JP2010/000516
§ 371 (c)(1),
(2), (4) Date: May 13, 2010

(87) PCT Pub. No.: WO2011/092739
PCT Pub. Date: Aug. 4, 2011

(65) Prior Publication Data
US 2011/0252214 A1 Oct. 13, 2011

(51) Int. Cl.
*G06F 12/00* (2006.01)
*G06F 13/00* (2006.01)
*G06F 3/06* (2006.01)

(52) U.S. Cl.
CPC ............ *G06F 3/0665* (2013.01); *G06F 3/0607* (2013.01); *G06F 3/0631* (2013.01); *G06F 3/0685* (2013.01)
USPC .................................. 711/114; 711/E12.078

(58) Field of Classification Search
None
See application file for complete search history.

(56) References Cited

U.S. PATENT DOCUMENTS

| | | | |
|---|---|---|---|
| 6,988,087 B2 | 1/2006 | Kanai et al. | |
| 8,117,235 B1 | 2/2012 | Barta | |
| 8,650,377 B2 * | 2/2014 | Maniwa et al. | 711/170 |
| 2005/0015547 A1 * | 1/2005 | Yokohata et al. | 711/114 |
| 2006/0218364 A1 * | 9/2006 | Kitamura | 711/162 |
| 2007/0079099 A1 | 4/2007 | Eguchi | |
| 2008/0007765 A1 * | 1/2008 | Ogata et al. | 358/1.15 |
| 2008/0082777 A1 | 4/2008 | Sakaguchi et al. | |
| 2008/0091748 A1 | 4/2008 | Beniyama et al. | |
| 2009/0043982 A1 | 2/2009 | Kano et al. | |
| 2009/0100214 A1 * | 4/2009 | Chen et al. | 711/103 |

(Continued)

FOREIGN PATENT DOCUMENTS

| | | |
|---|---|---|
| JP | 2002312699 A | 10/2002 |
| JP | 2003015915 A | 1/2003 |

(Continued)

*Primary Examiner* — Sean D Rossiter
(74) *Attorney, Agent, or Firm* — Volpe and Koenig, P.C.

(57) ABSTRACT

A storage apparatus coupled to a host device comprises a virtual volume which is a virtual logical volume configured of multiple virtual areas and a pool configured of multiple actual area groups of different performances. A controller manages pool status information which is the information showing which actual area is allocated to which virtual area and access load related to the virtual areas. A management system of the storage apparatus, with reference to the pool status information at multiple points of time from past to present and an access load threshold which is equal to or larger than 1, estimates the used capacity of each actual area group at points of time in the future, calculates the installed/removed amount of each actual area group which is the difference between the estimated used capacity and the current storage capacity, and performs the processing based on the calculated result.

14 Claims, 39 Drawing Sheets

(56) References Cited

U.S. PATENT DOCUMENTS

| | | | |
|---|---|---|---|
| 2009/0198940 A1* | 8/2009 | Ash et al. | 711/165 |
| 2009/0300285 A1 | 12/2009 | Nagai et al. | |
| 2010/0017632 A1* | 1/2010 | Cooper et al. | 713/320 |
| 2010/0125715 A1* | 5/2010 | Takamatsu et al. | 711/170 |
| 2010/0211737 A1* | 8/2010 | Flynn et al. | 711/114 |
| 2010/0217933 A1* | 8/2010 | Oe et al. | 711/114 |
| 2011/0167230 A1* | 7/2011 | Quan et al. | 711/154 |
| 2012/0130988 A1* | 5/2012 | Nica et al. | 707/718 |

FOREIGN PATENT DOCUMENTS

| | | |
|---|---|---|
| JP | 2003050724 A | 2/2003 |
| JP | 2007066259 A | 3/2007 |
| JP | 2007102455 A | 4/2007 |
| JP | 2008084253 A | 4/2008 |
| JP | 2008097502 A | 4/2008 |

* cited by examiner

|         |         |         | 1551    | 1552          | 1553     | 1554         | 1550 |
|---------|---------|---------|---------|---------------|----------|--------------|------|

| VOL ID | RESOURCE TYPE | CAPACITY | HIERARCHY ID |
|--------|---------------|----------|--------------|
| DEV1   | SSD           | 100GB    | TIER0        |
| DEV2   | SAS           | 100GB    | TIER1        |
| DEV3   | SATA          | 100GB    | TIER2        |
| DEV4   | SSD           | 100GB    | TIER0        |
| ...    | ...           | ...      | ...          |

FIG. 3

| VVOL ID | CAPACITY | START LBA | SEGMENT SIZE | SEGMENT ID | IOPS |
|---|---|---|---|---|---|
| VVOL1 | 10TB | 0 | 1000 | 0000 | 10000 |
| | | 1000 | 1000 | 2001 | 150 |
| | | ... | ... | ... | ... |
| VVOL2 | 10TB | 0 | 1000 | 1001 | 600 |
| | | ... | ... | ... | ... |
| ... | ... | ... | ... | ... | ... |

FIG. 5

| ID | TRIGGER | POLICY |
|---|---|---|
| 0 | SEGMENT MIGRATION TRIGGER | USE HIGHER TIERS IN DECREASING ORDER OF IOPS |
| 1 | SEGMENT MIGRATION TRIGGER | USE LOWER TIERS IF HIGHER TIERS BECOME FULL |
| 2 | SEGMENT MIGRATION TRIGGER | USE HIGHER TIERS IN ORDER OF LAST ACCESSED DAY AND TIME FROM NEWEST |
| ... | ... | ... |

FIG. 6

| HIERARCHY ID | RESOURCE TYPE | ACCEPTABLE IOPS RANGE | ASSUMED RESPONSE TIME |
|---|---|---|---|
| TIER 0 | SSD | 501 OR LARGER | 1MS |
| TIER 1 | SAS | 101 – 500 | 10MS |
| TIER 2 | SATA | 100 OR SMALLER | 100MS |

FIG. 9

| 2640 ↘ IOPS / TIME | ... | 2643 ↓ 10 | ... | 100 | ... NUMBER OF SEGMENTS 2644 | 1000 | ... |
|---|---|---|---|---|---|---|---|
| ... | ... | ... | ... | ... | ... | ... | ... |
| APRIL, YEAR (X-1) | ... | 10000 | ... | 5000 | ... | 100 | ... |
| MAY, YEAR (X-1) | ... | 11000 | ... | 5100 | ... | 110 | ... |
| ... | ... | ... | ... | ... | ... | ... | ... |
| 2641 MARCH, YEAR X | ... | 21000 | ... | 6100 | ... | 210 | ... |
| APRIL, YEAR X | ... | 22000 | ... | 6200 | ... | 220 | ... |
| 2642 MAY, YEAR X (ESTIMATION) | ... | n[10] | ... | n[100] | ... | n[1000] | ... |

2645 ESTIMATED NUMBER OF SEGMENTS

INSTALLATION OF FOLLOWING MEDIA IS     5211
REQUIRED AFTER T

| HIERARCHY ID | RESOURCE TYPE | ADDITIONALLY INSTALLED AMOUNT |
|---|---|---|
| Tier 0 | SSD | 10TB |
| Tier 1 | SAS | 20TB |
| Tier 2 | SATA | 50 TB |

ASSUMED PERFORMANCE AND CAPACITY INSTALLATION   5221
COST IN THIS CASE ARE AS FOLLOWS

| ITEM | TYPE | VALUE |
|---|---|---|
| ASSUMED PERFORMANCE | AVERAGE RESPONSE TIME | 13ms |
| ADDITIONAL CAPACITY INSTALLATION COST | COST | 10k $ |

Information                                5431

AS HIGHLY FREQUENTLY ACCESSED STORAGE AREAS
TEND TO INCREASE, INSTALLATION OF HIGH TIERS IS
REQUIRED

INSTALLATION OF FOLLOWING MEDIA IS REQUIRED AFTER T

| HIERARCHY ID | RESOURCE TYPE | ADDITIONALLY INSTALLED AMOUNT |
|---|---|---|
| Tier 0 | SSD | 0 TB |
| Tier 1 | SAS | 0 TB |
| Tier 2 | SATA | 50 TB |

TARGET PERFORMANCE CAN BE ACHIEVED EVEN IF FOLLOWING MEDIA ARE REMOVED

| HIERARCHY ID | RESOURCE TYPE | REMOVABLE AMOUNT |
|---|---|---|
| Tier 0 | SSD | 5 TB |
| Tier 1 | SAS | 0 TB |
| Tier 2 | SATA | 0 TB |

ASSUMED PERFORMANCE IN THIS CASE IS AS FOLLOWS

| ITEM | TYPE | VALUE |
|---|---|---|
| ASSUMED PERFORMANCE | AVERAGE RESPONSE TIME | 13ms |

INSTALLATION OF FOLLOWING MEDIA IS REQUIRED AFTER T

| INSTALLATION DESTINATION | HIERARCHY ID | RESOURCE TYPE | INSTALLED AMOUNT |
|---|---|---|---|
| LOCAL | Tier 0 | SSD | 10TB |
| ARBITRARY | Tier 1 | SAS | 20TB |
| ARBITRARY | Tier 2 | SATA | 50 TB |

Information

AS HIGHLY FREQUENTLY ACCESSED STORAGE AREAS TEND TO INCREASE, INSTALLATION OF HIGH TIERS IS REQUIRED

MANAGEMENT SYSTEM CALCULATING STORAGE CAPACITY TO BE INSTALLED/REMOVED

TECHNICAL FIELD

This invention relates to management of a storage apparatus.

BACKGROUND ART

Storage apparatuses comprising multiple physical storage devices are well known. Physical storage devices are hard disk drives, flash memory devices, and others. A storage apparatus generally comprises RAID groups complying with the technology of RAID (Redundant Array of Independent (or Inexpensive) Disks). A RAID group is configured of multiple physical storage devices and, in the RAID group, data is stored in accordance with a specified RAID level. With reference to the storage space of the RAID group, one or multiple logical storage devices (logical volumes) are created. The logical volumes are provided to a host computer coupled to the storage apparatus. The host computer transmits access commands (e.g. write commands or read commands) specifying the provided logical volumes to the storage apparatus. By this, to the logical volumes, data access is performed.

As a storage apparatus, a storage apparatus to which the Thin Provisioning technology is applied is well known (e.g. Patent Literature 1). According to the Thin Provisioning (also called Dynamic Provisioning), instead of logical volumes whose storage capacity is fixed, virtual volumes (hereinafter referred to as VVOLs) which are virtual logical volumes are provided to the host computer. A VVOL is a set of multiple virtual areas (virtual storage areas). If a write occurs from the host computer to the VVOL, a segment is allocated to the virtual area from the pool. Therefore, according to Thin Provisioning, the storage capacity provided to the host computer can be expanded dynamically. Note that a pool is a storage area configured of multiple segments. A segment is an actual area (an actual storage area) and, as more specifically described, for example, a storage area acquired by splitting the logical volumes configuring the pool (hereinafter referred to as PVOLs) by LBAs (Logical Block Addresses) or others. At this point, an "LBA" is an address used for specifying the position on the logical volume when the host computer reads and writes the data from and to the storage apparatus.

Meanwhile, a pool in which multiple segment groups of different performances are mixed (Patent Literature 2) is well known. Hereinafter, one segment group is referred to as a "medium." For example, a high-performance media is configured of high-performance PVOLs, and a low-performance media is configured of low-performance PVOLs. The performance of a PVOL depends on the performance of a physical storage device which is the base of the PVOL (and/or the RAID level of the RAID group). Data migration from a certain segment in a certain medium to a segment in another medium (hereinafter referred to as segment migration) can be performed.

For operating a pool, if segments unallocated to any VVOLs are insufficient, the expansion of the storage capacity of the pool is required. A method for determining the storage capacity to be added is disclosed, for example, in the Patent Literature 3. According to the Patent Literature 3, with reference to the increase rate of segments allocated to a virtual volume, the storage capacity to run short in the future is estimated and, with reference to the result of the estimation, the storage capacity to be added is determined.

CITATION LIST

Patent Literature

[PTL 1] Japanese Unexamined Patent Application Publication No. 2003-015915
[PTL 2] Japanese Unexamined Patent Application Publication No. 2007-066259
[PTL 3] Japanese Unexamined Patent Application Publication No. 2008-097502

SUMMARY OF INVENTION

Technical Problem

In a pool in which multiple media of different performances are mixed, for performing an addition of the storage capacity (e.g. PVOLs) (hereinafter referred to as an "installation"), the storage capacity to be installed (hereinafter referred to as an "installed amount") must be determined. According to the Patent Literature 3, the amount of the installed storage capacity of the entire pool can be determined, but it is not possible to appropriately determine what amount of storage capacity to install to which medium. Therefore, an installation by which the performance is improved more highly than required or an installation which deteriorates the performance significantly might be performed.

The above-mentioned problems might occur when removing the storage capacity (hereinafter referred to as a "removal").

Therefore, the purpose of this invention is, for a pool configured of multiple actual area groups of different performances, to allow to calculate an appropriate installed/removed amount for each actual area group.

Solution to Problem

A storage apparatus coupled to a host device comprises virtual volumes which are virtual logical volumes configured of multiple virtual areas, a pool configured of multiple actual area groups of different performances, and a controller which, in response to access commands from the host device, accesses an actual area allocated to a virtual area identified by the access commands. The controller manages pool status information which is the information showing which actual area is allocated to which virtual area and the access load related to the virtual area. The management system of the storage apparatus comprises a storage resource and a processor coupled to the storage resource. The storage resource stores capacity management information which is the information showing the current storage capacity of each actual area group. The processor, with reference to the pool status information at multiple points of time from past to present and one or more access load thresholds, estimates the used capacity of each actual area group at points of time in the future. The processor calculates the installed/removed amount, which is a difference between the estimated used capacity and the current storage capacity shown by the capacity management information, for each actual area group, and performs the processing based on the result of the calculation.

For example, the controller can migrate data in a first actual area in a first actual area group to a second actual area in a second actual area group of an appropriate type for the access load of the first actual area and allocate the second actual area instead of the first actual area to a virtual area to which the first actual area is allocated.

The host device may be a computer or may also be a storage apparatus different from the above-mentioned storage apparatus. Meanwhile, the performance of actual area groups is, for example, the performance related to access. The performance related to access is, for example, a response time which is the length of time since a command for data access is input until a response to the command is output, or a data amount which is input/output per unit of time. Meanwhile, the access load is the load related to access, for example, an access frequency (the number of accesses performed per unit of time) or a data transfer rate (the amount of data transferred per unit of time). Furthermore, the "access load related to the virtual areas" may be the access load on the virtual areas (the data access load in the virtual areas) or may also be the access load on the actual areas allocated to the virtual areas. Furthermore, access is, for example, read and/or write.

The management system may be one or more computers existing outside the storage apparatus, or may also be integral with the controller, or may also be integral with the host device, or may also be realized as a combination of the storage apparatus and the device(s) existing outside the storage apparatus.

Advantageous Effects of Invention

For a pool configured of multiple actual area groups of different performances, an appropriate installed/removed amount can be calculated for each actual area group.

BRIEF DESCRIPTION OF DRAWINGS

FIG. 3 shows an example of a physical resource table 1550.

FIG. 5 shows an example of a virtual volume management table 1570.

FIG. 6 shows an example of a migration policy table 1580.

FIG. 9 shows an example of an IOPS performance evaluation table 2570.

FIG. 19 shows an example of a segment IOPS distribution history table 2640.

FIG. 27 shows an example of a GUI 5400 displayed at the step 4358 in FIG. 25.

FIG. 29 shows an example of a GUI 5500 displayed at the step 4373 in FIG. 28.

FIG. 39 shows an example of a GUI showing the result of an estimation performed by a capacity estimation program 3570 related to the Embodiment 6.

DESCRIPTION OF EMBODIMENTS

Figure 1:
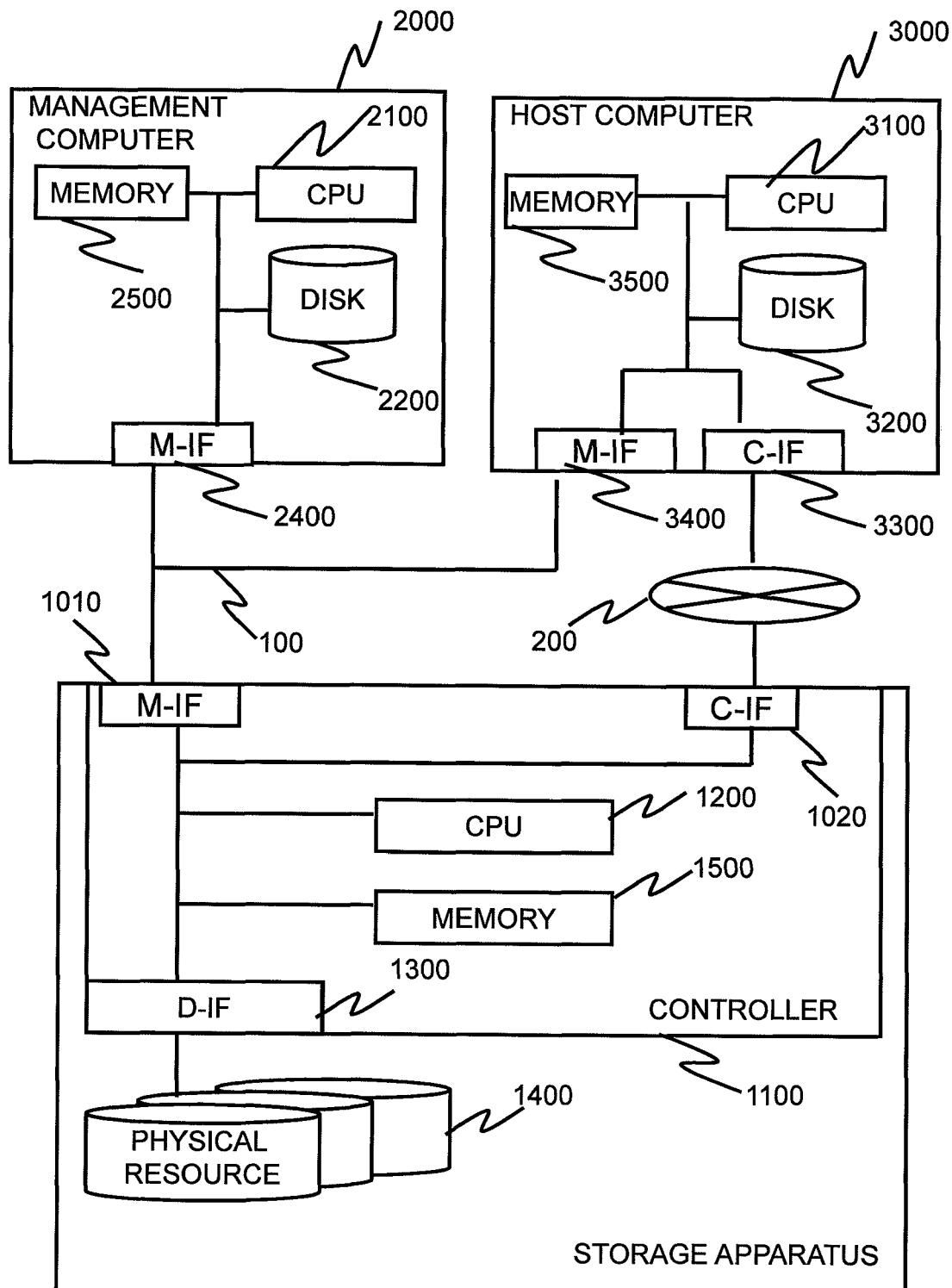
FIG. 1 shows the configuration of a storage system related to the Embodiment 1 of this invention.

Some of the embodiments of this invention are described below. Note that the technical scope of this invention must not be limited to the respective embodiments.

Note that, though the description below describes various types of information using the term of "a xxx table," the various types of information may also be expressed by other data structures than tables. For showing the independence of the data structure, "a xxx table" can be referred to as "xxx information."

Furthermore, the description below might be given with a "program" as a subject, as the program performs the specified processing by being performed by a processor (e.g. a CPU (Central Processing Unit)) while appropriately using a storage resource (e.g. memory) and a communication control device (e.g. a communication port), the description with the processor as a subject may also be permitted. Furthermore, the processing described with the program as a subject may also be treated as the processing performed by the management system. Furthermore, part of or the entire program may also be permitted to be realized by dedicated hardware. Therefore, the processing described with the program as a subject may also be treated as the processing performed by a controller. The controller may include a processor and a storage resource storing a computer program performed by the processor, or may also include the above-mentioned dedicated hardware. Furthermore, the computer program may also be installed by a program source to the respective computers. The program source, for example, may also be a program distribution server or a storage medium.

Note that the management system is one or more computers, for example, a management computer or a combination of the management computer and a computer for display. As more specifically described, for example, if the management computer displays information for display, the management computer is the management system. Meanwhile, for accelerating the processing or achieving high reliability, the functions equivalent to the management computer may also be realized by multiple computers, in which case the relevant multiple computers (a computer for display may be included if the computer for display performs display) are the management system.

Embodiment 1

<Overview>

Firstly, the Embodiment 1 of this invention is described.

The Embodiment 1 comprises a storage apparatus to which the Thin Provisioning technology and the segment migration technology are applied and a computer managing the storage apparatus (hereinafter referred to as a management computer). The storage apparatus measures the access frequency of each segment. The storage apparatus, with reference to the access frequency of each segment and multiple previously prepared acceptable access frequency ranges corresponding to multiple media, determines a migration source segment and a migration destination segment. Then, the storage apparatus performs data migration from the migration source segment to the migration destination segment. By this method, the data is allocated to a medium which is appropriate for the access frequency of the data. Note that the management computer may acquire the information showing the access frequency of each segment from the storage apparatus and, with reference to the access frequency of each segment and the multiple acceptable access frequencies corresponding to the multiple media, determine a migration source segment and a migration destination segment. Then, the management computer, by transmitting a segment migration instruction comprising the information showing the determined migration source segment and the information showing the migration destination segment to the storage apparatus, may make the storage apparatus perform data migration from the migration source segment to the migration destination segment.

The management computer, at a fixed time interval, acquires the information showing the pool usage status at that point of time (hereinafter referred to as the pool status information), for example, the information including (A) to (C) described below from the storage apparatus.

(A) The identification information of segments allocated to the VVOL.
(B) The information showing the access frequency of the segments allocated to the VVOL.
(C) The identification information of the media to which the segments allocated to the VVOL belong.

The management computer, with reference to the pool status information acquired at multiple points of time, calculates the distribution of the access frequencies and the number of segments at the respective points of time. The management computer, with reference to the distribution of the transition of the access frequencies and the number of segments and the multiple acceptable access frequencies corresponding to the multiple media, for each medium, estimates the number of segments to be allocated to the VVOL after a specified period from the present (hereinafter referred to as the future number of segments). The value of the future number of segments $N_{future}$ for a medium minus the current number of segments comprising the medium (hereinafter referred to as the current number of segments) $N_{current}$, ($N_{future}-N_{current}$), is the installed amount for the medium. For example, for a medium A, if the installed amount is a positive value, as it is highly possible that the number of segments will be insufficient after a specified period, it is desirable to install the installed amount of segments to the medium A at the present point of time. Meanwhile, for the medium A, if the installed amount is zero or a negative value, as it is highly possible that the number of segments will not be insufficient even after a specified period is passed, it is not necessary to install any segments to the medium A at the present time (the installed amount of segments may be removed from the medium A).

As described above, the management computer can calculate the installed amount for each medium with reference to the pool status information at respective points of time. Therefore, an installation by which the performance is improved more highly than required, which increases the cost uselessly, or an installation which deteriorates the performance significantly can be avoided. Note that the "cost" in this embodiment indicates the load. The load may be in terms of the cost or may also be in terms of power consumption.

Hereinafter, with reference to the figures, the Embodiment 1 is described in details.

<Description of Configuration>

FIG. 1 shows the configuration of a storage system related to the Embodiment 1 of this invention.

The storage system in the Embodiment 1 comprises a storage apparatus 1000, a management computer 2000 coupled to the storage apparatus 1000 and which manages the same, and a host computer 3000 using storage areas provided by the storage apparatus 1000. Note that multiple host computers 3000 may exist.

A management IF (M-IF in the FIG. 1010 of the storage apparatus 1000 and a management IF 3400 of the host computer 3000 are coupled to a management IF 2400 of the management computer 2000 via a data network 100 such as SAN (Storage Area Network) or LAN (Local Area Network). A communication IF 1020 of the storage apparatus 1000 is coupled to a communication IF 3300 of the host computer via a data network 200 such as SAN or LAN. Each management IF and communication IF is, if the data network is SAN, an HBA (Host Bus Adapter) and others in the computer and a port and others in the storage apparatus and, if the data network is LAN, an NIC (Network Interface Card) and others both in the computer and in the storage apparatus. That is, what type of communication interface device each management IF and communication IF is depends on the type of network the IF is coupled to and the type of apparatus which comprises the IF. Note that the data network 100 and the data network 200 may also be the same network. Furthermore, the respective IFs may be directly connected by one cable or may also be connected via switches.

Next, the hardware configuration of the storage apparatus 1000 is described.

The storage apparatus 1000 comprises multiple physical resources 1400. A physical resource 1400 is a physical storage area. With reference to the physical resources 1400, a logical volume which is a logical storage device is set. At this point, the "physical storage area" may be one physical storage device or a RAID group configured of multiple physical storage devices. Furthermore, a physical storage device is an SSD (Solid State Drive), an SAS (Serial Attached SCSI)-HDD (hard disk drive), an SATA (Serial Advanced Technology Attachment)-HDD, and others. As described above, in the storage apparatus 1000, multiple physical resources 1400 of different performances are mixed.

Meanwhile, the storage apparatus 1000 comprises a controller 1100 which is a control device for controlling data input/output. The controller 1100, as well as the above-mentioned management IF 1010 and the communication IF 1020, comprises a disk IF 1300 for the communication with the physical resources 1400, a memory 1500, and a CPU 1200 coupled to the same. The memory 1500 may include a cache memory for temporarily storing the data accessed by the physical resources 1400 in response to access commands from the host computer 3000.

Figure 2:
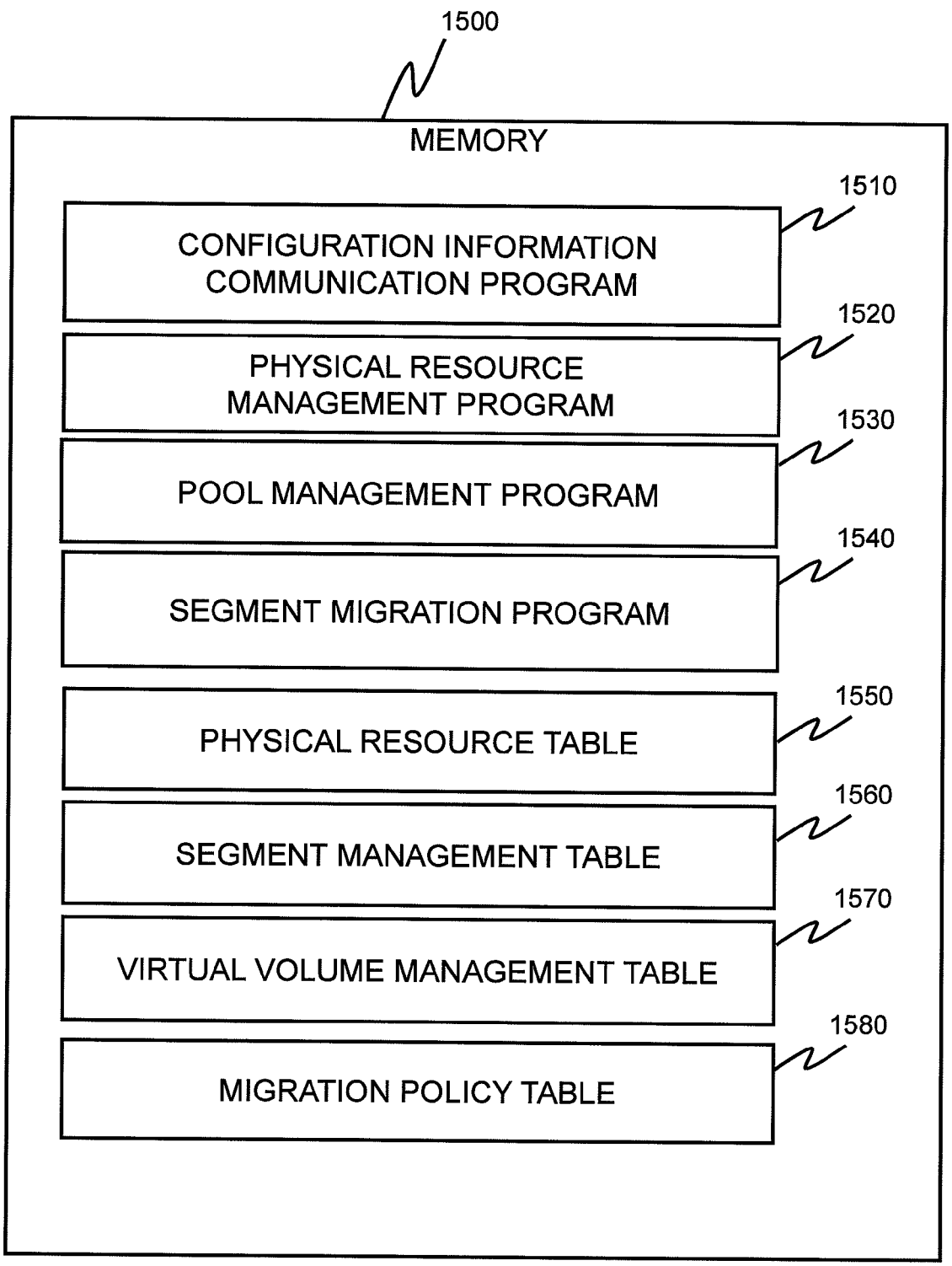
FIG. 2 shows programs and information stored in a memory 1500 in the storage apparatus 1000 related to the Embodiment 1.

FIG. 2 shows programs and information stored in the memory 1500.

The programs are a configuration information communication program 1510, a physical resource management program 1520, a pool management program 1530, and a segment migration program 1540. The processing performed by the programs 1510, 1520, 1530, and 1540 is actually performed by the CPU 1200 performing those programs. The types of information are a physical resource table 1550, a segment management table 1560, a virtual volume management table 1570, and a migration policy table 1580.

The configuration information communication program 1510 performs the processing of transmitting the tables described later to the outside with reference to information acquisition requests [transmitted] via the management IF 1010, and makes the respective programs perform the processing in accordance with setting processing requests.

The physical resource management program 1520 performs the management of the configuration of logical volumes. As more specifically described, the program 1520 manages the physical resource table 1550.

FIG. 3 shows an example of a physical resource table 1550.

The physical resource table 1550 comprises the information related to the logical volumes based on the physical resources. As more specifically described, the physical resource table 1550, for each logical volume which the storage apparatus 1000 manages, comprises the information described below,
- a VOL ID 1551 which is an ID for identifying the logical volume,
- a resource type 1552 showing the type of the physical resource 1400 which is the base of the logical volume.
- a capacity 1553 showing the storage capacity of the logical volume, and
- a hierarchy ID 1554 which is an ID of the hierarchy to which the logical volume belongs. At this point, a hierarchy is a set of multiple logical volumes of the same performance and operation cost, and is equivalent to the above-mentioned "medium." For example, to a hierarchy (medium) as a set of logical volumes based on an SSD, which is estimated to have the high performance, an ID "TIER 0" showing a higher layer hierarchy is allocated. To a hierarchy (medium) as a set of logical volumes based on an SAS-HDD, which is estimated to have the lower performance than the hierarchy based on the SSD, an ID "TIER 1" showing a lower hierarchy than the hierarchy based on the SSD is allocated. To a hierarchy (medium) as a set of logical volumes based on a SATA-HDD, which is estimated to have the lower performance than the hierarchy based on the SAS-HDD, an ID "TIER 2" showing a lower hierarchy than the hierarchy based on the SAS-HDD is allocated. A hierarchy ID 1554 may be automatically allocated by the physical resource management program 1520 when creating a logical volume, or may also be manually allocated by the administrator who manages the storage apparatus 1000. In addition, the table 1550 may include a RAID level showing the degree of redundancy of RAID and others, in which case, the hierarchy ID 1554 considering the performance and the operation cost complying with the RAID level as well as the resource type 1552 may also be allocated. Hereinafter, a hierarchy might also be referred to as a "medium." Note that three or more types of hierarchies (media) may also exist.

FIG. 2 is referred to again.

A pool management program 1530 manages the pool and the virtual volumes for realizing the Thin Provisioning technology. As more specifically described, for example, the program 1530 manages a segment management table 1560 and a virtual volume management table 1570.

Figure 4:
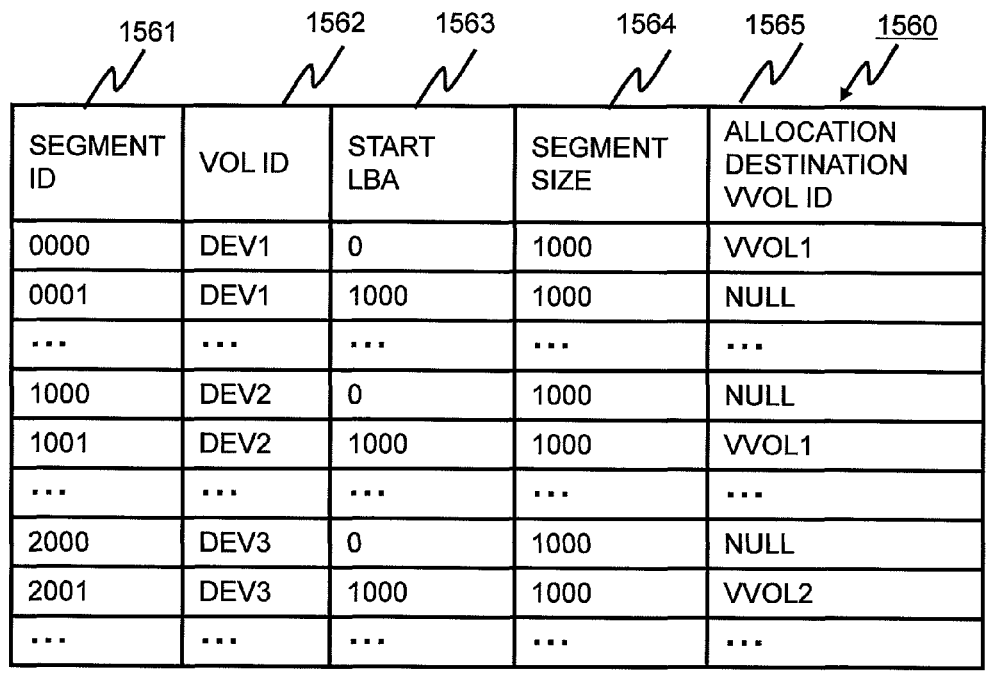
FIG. 4 shows an example of a segment management table 1560.

FIG. 4 shows an example of a segment management table 1560.

The segment management table 1560 comprises the information related to segments. As more specifically described, the segment management table 1560, for each segment configuring the pool, comprises the information below,
- a segment ID 1561 which is an ID for uniquely identifying a segment,
- a VOL ID 1562 which is an ID showing the logical volume (pool volume) in which the segment exists,
- an LBA 1563 which is an LBA showing the starting point in the logical volume (the starting point of the segment),
- a segment size 1564 showing the size of the segment, and
- an allocation destination VVOL ID 1565 which is an ID of the virtual volume (VVOL) as the allocation destination of the segment.

According to this table 1560, for example, a segment ID: 0000, in a logical volume: DEV1, takes the segment size: 1000 starting at the LBA 0 (from the LBA: 0 to the LBA: 999), and is allocated to a virtual volume: VVOL 1. Meanwhile, segments whose allocation destination showing VVOL ID: NULL show that the segments are not allocated to any VVOLs yet. For making the description below easy to understand, the size of all the segments is assumed to be 100 MB (Mega Bytes). However, the size of each segment may be other than 100 MB, may also be variable instead of fixed, and all the segments are not necessarily required to be of the same size.

This embodiment assumes the number of pools is one. However, it may also be permitted that multiple pools exist.

Meanwhile, a "segment" is an actual area (an actual storage area) configuring the pool. The pool comprises multiple segment groups of different performances. Each segment group is configured of multiple logical volumes of the same performance. A logical volume as a component of the pool is also referred to as a "pool volume." A "pool volume" may be an actual logical volume based on a physical resource 1400, or may also be a logical volume based on a storage resource (a logical volume or a physical resource) in an external storage apparatus not shown in the figure. That is, a storage only has to be a storage area which can be allocated to a VVOL.

A VVOL is a virtual logical volume (a volume complying with the Thin Provisioning technology) configured of multiple virtual areas (virtual storage areas). The VVOL is provided to the host computer 3000.

FIG. 5 shows an example of the virtual volume management table 1570.

The virtual volume management table 1570 comprises the information related to VVOLs. As more specifically described, the virtual volume management table 1570, for each virtual area, comprises the information below, a VVOL ID 1571 which is an ID of a VVOL comprising a virtual area, a capacity 1572 showing the storage capacity of the VVOL (the storage capacity recognized by the host computer 3000), a start LBA 1573 showing the starting point of the virtual area in the VVOL, a segment size 1574 showing the size of a segment allocated to the virtual area, a segment ID 1575 which is the ID of the segment allocated to the virtual area, and an IOPS (Input Output Per Second) 1576 which is the access frequency to the segment allocated to the virtual area.

According to this table 1570, for example, a VVOL: VVOL 1 is recognized by the host computer 3000 as a volume of 10 TB (terabytes). To a virtual area for the size 1000 starting at the LBA: 0 of the VVOL: VVOL 1, a segment of the segment ID: 0000 is allocated. The access frequency of the segment is 10000.

Note that a virtual area to which no segment is allocated can be distinguished by the method (a) or (b) described below.

(a) The segment ID 1575 corresponding to the virtual area is "NULL."

(b) No record corresponding to the virtual area exists in the table 1570.

Furthermore, the access frequency, as long as expressed by the number of accesses in each fixed period, does not necessarily have to be the IOPS. The IOPS may also be an IO (Input Output) unit occurring during a segment migration which is described later and others. Furthermore, depending on the migration policy table 1580, the virtual volume management table 1570, in addition to the above-mentioned information, may also maintain the information to be the criteria for determining the data migration source (e.g. last accessed date and time to each segment).

The IOPS, which is the IOPS of a segment, is updated when the segment is accessed. That is, even if a virtual area is accessed, if there is no need to access the segment (e.g. if a read processing is stopped by providing the data in the cache memory to the host computer 3000 because the data is the target for read to the cache memory), the IOPS of the segment allocated to the virtual area is not updated. Note that, if a virtual area is accessed, regardless of whether the segment allocated to the virtual area is accessed or not, the IOPS 1576 corresponding to the virtual area may also be updated. Furthermore, if the access to the virtual area is a specific type of access (e.g. in case of a read access), the IOPS 1576 corresponding to the virtual area does not have to be updated.

FIG. 2 is referred to again. The pool management program 1530, by using the segment management table 1560 and the virtual volume management table 1570, manages the correspondence relationship between virtual areas and segments as well as, if a virtual area to which no segment is allocated is accessed, allocates free segments to the virtual area.

If the storage apparatus 2000 receives a write command including the access destination information (e.g. the ID and the LBA of a VVOL) from the host computer 3000, the write processing including the processing below is performed.

(S001) The pool management program 1503 stores the data complying with the write command in the cache memory. At this point, the program 1503 may return a write completion response to the host computer 3000.

(S002) The pool management program 1530, with reference to the access destination information, identifies a VVOL and a virtual area to be the write destination.

(S003) The program 1530 determines whether a segment is allocated to the write destination virtual area or not with reference to the table 1570.

(S004) If the determination at S003 is negative, the program 1530 identifies a free segment (a segment not allocated to any virtual area) with reference to the table 1560. The program 1530 allocates the identified segment to the write destination virtual area. As more specifically described, the program 1530 registers the ID, the size and the IOPS of the identified segment to the record (the record in the table 1570) corresponding to the write destination virtual area.

(S005) If the determination at S003 is positive, or after S004, the program 1530 writes the data in the cache memory to the segment allocated to the write destination virtual area. At this point, the program 1503 may return a write completion response to the host computer 3000. Note that, at this point, the IOPS 1576 of the segment is updated by the segment migration program 1540.

If the storage apparatus 2000 receives a read command including the access destination information (e.g. the ID and the LBA of a VVOL) from the host computer 3000, the read processing including the processing below is performed.

(S011) The pool management program 1530, with reference to the access destination information, identifies a VVOL and a virtual area to be the read source.

(S012) The program 1530 determines whether any read target data remains in the cache memory or not.

(S013) If the determination at S012 is positive, the program 1530 transmits the read target data in the cache memory to the to the host computer 3000. In this case, the IOPS 1576 of the segment allocated to the read source virtual area is not updated.

(S014) If the determination at S012 is negative, the program 1530 determines the segment allocated to the read source virtual area with reference to the table 1570.

(S015) The program 1530 reads the read target data from the identified segment and stores the cache memory. At this point, the IOPS 1576 of the segment is updated by the segment migration program 1540.

(S016) The program 1530 transmits the read target data stored in the cache memory at S015 to the host computer 3000.

The segment migration program 1540 and the migration policy table 1580 are described below.

The segment migration program 1540 monitors accesses to each segment, and updates the IOPS 1576 of the virtual volume management table 1570. In addition, the segment migration program 1540, at an interval specified by the system or the administrator, with reference to the migration policy table 1580, performs segment migration between media (hierarchies) complying with the table 1580. Then, the program 1540 updates the relationship between the virtual areas and the segments (the segment management table 1560 and the virtual volume management table 1570). As more specifically described, the program 1540, to the virtual area to which a migration source segment is allocated, instead of the migration source segment, allocates a migration destination segment.

FIG. 6 shows an example of the migration policy table 1580.

The migration policy table 1580, for each policy, comprises the information described below,
an ID 1581 for identifying a policy,
a migration performance trigger 1582, and
a policy 1583 stating the processing to be performed.

The trigger 1582 and the policy 1583 may be factory default settings of the storage, or may also be manually set by the administrator later. For example, if complying with the policies ID: 0 and ID: 1 shown in FIG. 6, the segment migration program 1540, in descending order of IOPS, migrates data in the segment to the segments in the hierarchy: TIER 0 (SSD medium). If there is no more free segment in the SSD medium, the data is migrated to the free segments in the next hierarchy: TIER 1 (SAS medium). By this method, media can be utilized in accordance with the access frequency of the segment.

Next, the hardware configuration in the management computer 2000 is described with reference to FIG. 1.

The management computer 2000, in addition to the management IF 2400, comprises a memory 2500, a disk 2200 which is an auxiliary storage unit, and a CPU 2100 coupled to the above.

Figure 7:
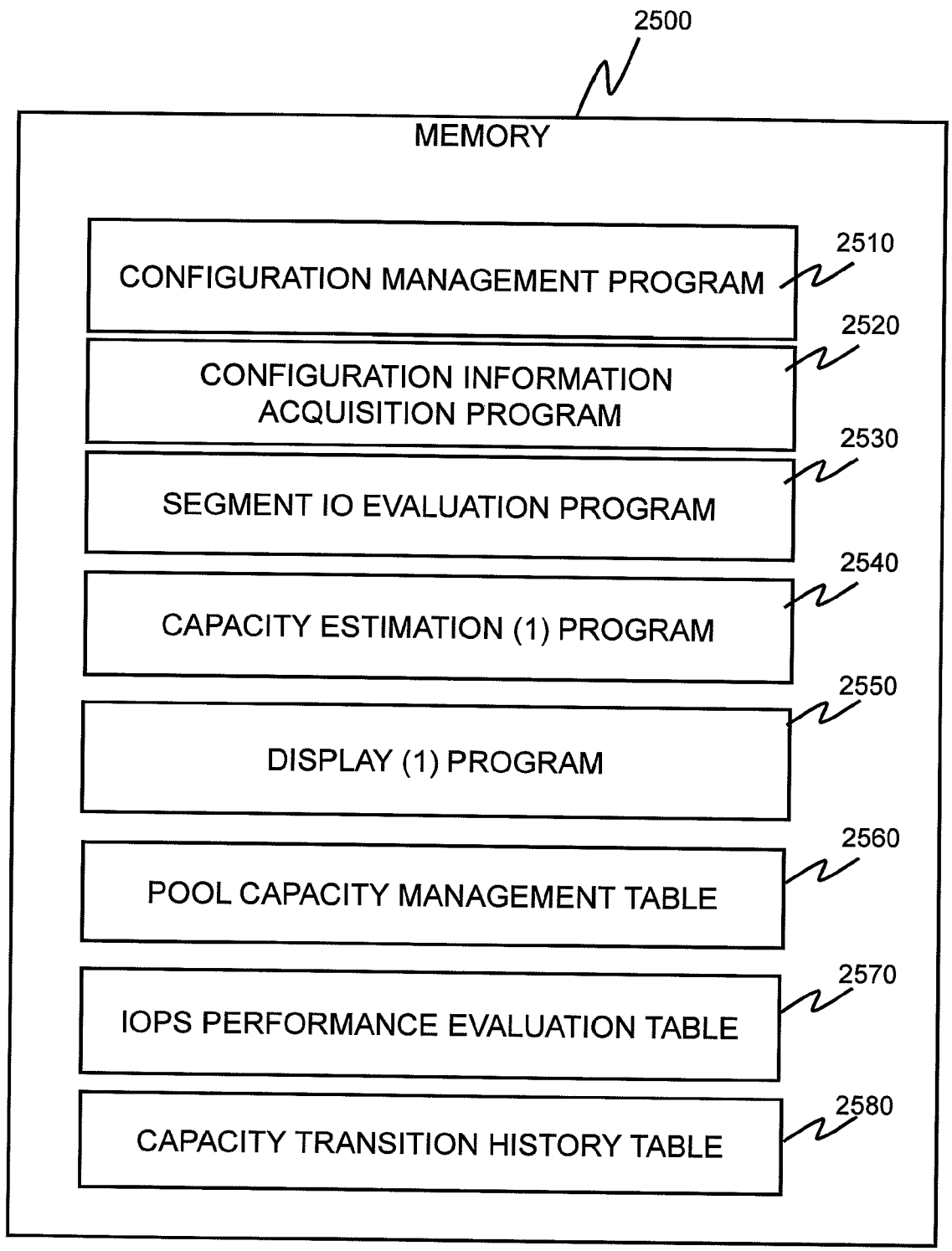
FIG. 7 shows programs and tables stored in a memory 2500 in the management computer 2000 related to the Embodiment 1.

FIG. 7 shows programs and information stored in the memory 2500.

The programs are a configuration management program 2510, a configuration information acquisition program 2520, a segment IO evaluation program 2530, a capacity estimation (1) program 2540, and a display (1) program 2550. These programs are performed by the CPU 2100. The information is a pool capacity management table 2560, an IOPS performance evaluation table 2570, and a capacity transition history table 2580.

The configuration management program 2510 receives a setting instruction from the storage administrator and performs the setting instruction for the storage apparatus 1000. For example, the administrator, by using the configuration management program 2510, can perform the setting for the migration policy table 1580 which the storage apparatus 1000 comprises and other processing. A type of information managed by the configuration management program 2510 is the pool capacity management table 2560.

Figure 8:
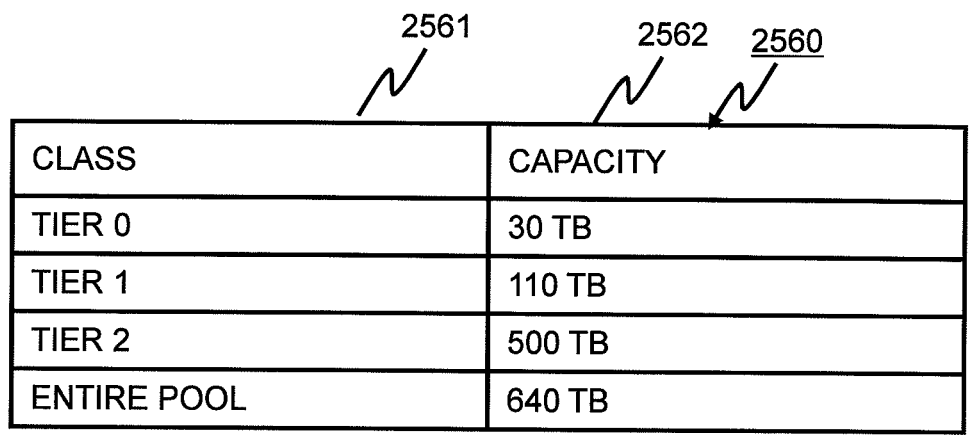
FIG. 8 shows an example of a pool capacity management table 2560.

FIG. 8 shows an example of the pool capacity management table 2560.

The pool capacity management table 2560 comprises the information related to the pool capacity. As more specifically described, the table 2560, for each medium, comprises the information described below,
a class 2561 showing the type of medium and
a capacity 2562 showing the total storage capacity of all the segments comprising the medium.

A class 2561 may also be an "entire pool," in which case, as the capacity 2562, the total storage capacity of all the media comprising the pool is recorded. According to the table 2560 in FIG. 8, the pool comprises a hierarchy: TIER 0 of 30 TB, a hierarchy: TIER 1 of 110 TB, and a hierarchy: TIER 2 of 500 TB, and the pool capacity is the sum of the above, 640 TB. The table 2560, practically, always matches the pool status of the storage apparatus 1000. This is because the configuration management program 2510, by using the configuration information acquisition program 2520, always monitors the status of the pool which the storage apparatus 1000 comprises and performs other processing.

The configuration information acquisition program 2520 communicates with the configuration information communication program 1510 via the management IF 1010 which the storage apparatus 1000 comprises, and acquires the information which the storage apparatus 1000 comprises.

The segment IO evaluation program 2530, by using the IOPS evaluation table 2570, with reference to the access frequency of a segment, calculates a medium to which the data in the segment is desired to be allocated, and records the result of calculating to the capacity transition history table 2580.

The capacity estimation (1) program 2540, by using the capacity transition history table 2580, estimates the capacity to be required in the future for each medium.

The processing performed by these programs is described in details with reference to the flowcharts described later.

FIG. 9 shows an example of the IOPS performance evaluation table 2570.

The IOPS performance evaluation table 2570 comprises the information showing to what type of medium the data in the segment whose IOPS belongs to which IOPS range should be allocated. As more specifically described, the table 2570, for each medium, comprises the information described below,
a hierarchy ID 2571 for identifying a medium (hierarchy),
a resource type 2572 showing the type of the media (the type of a physical resource which is the base of the logical volumes configuring the medium),
an acceptable IOPS range 2573 which is the desirable IOPS range of the segment comprising the data which is desired to be allocated to the medium, and
an assumed response time 2574 which is the performance (response time) expected if the IOPS of all the used segments in the medium (the segments allocated to the virtual area) are within the acceptable IOPS range 2573. The "response time" at this point indicates the response time in the storage apparatus 1000, as more specifically described, the length of time since a command for accessing a segment is issued from the controller 1100 until the access for the segment is completed. The "assumed response time" is the assumed response time (the expected response time).

This table 2570 is, unlike the above-mentioned migration policy table 1580, the table for calculating, with reference to the IOPS in a segment, the TIER to which the data in the segment is desired to be allocated.

An example of calculating the acceptable IOPS range 2573 and the assumed response time 2574 is described below.

Generally, as for a physical resource 1400, if the IOPS is equal to or below the identified IOPS (hereinafter referred to as a border IOPS), the same degree of response time (assumed response time) can always be expected but, if the IOPS exceeds the border IOPS, the response time increases rapidly (exceeds the assumed response [time]). The IOPS is larger as the performance of a medium is higher. Considering this, by combining the border IOPS of each medium, the acceptable IOPS range 2573 shown in FIG. 9 can be calculated. In addition, the IOPS performance evaluation table 2570 may also be determined by the direct input by the administrator. Furthermore, in the Embodiment 1, it may also be permitted that the assumed response time 2574 does not exist.

Figure 10:
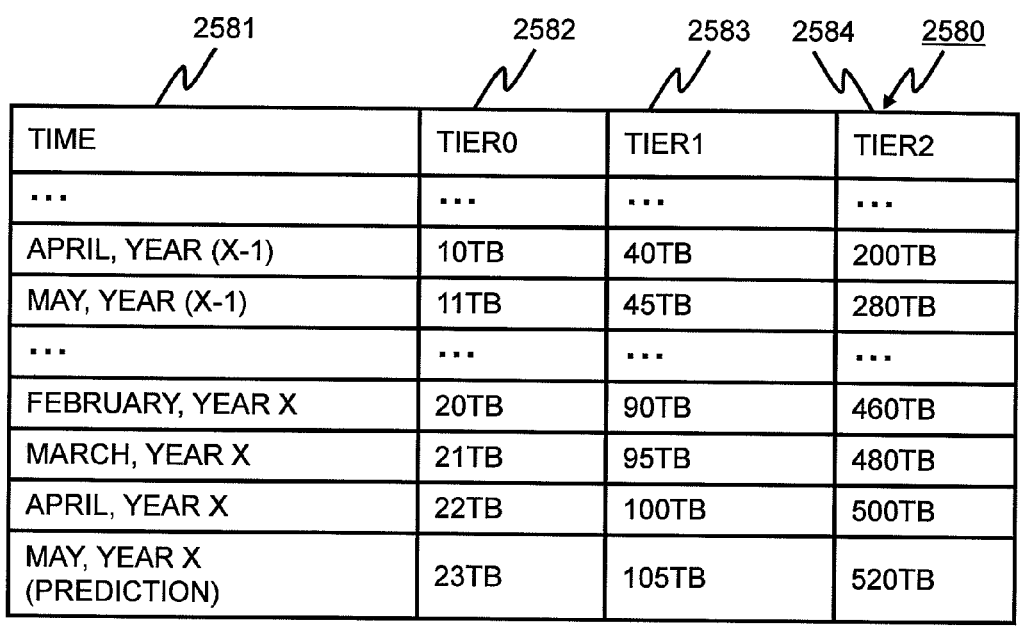
FIG. 10 shows an example of a capacity transition history table 2580.

FIG. 10 shows an example of the capacity transition history table 2580.

The capacity transition history table 2580 comprises the information showing the used capacity of each medium (the total storage capacity of the used segments) calculated with reference to the information acquired from the storage apparatus 1000 at respective point of time. As more specifically described, the table 2580, for each point of time, comprises the information described below, Time 2581 showing the date and time of a point of time,
information 2582 showing the used capacity of the TIER 0 (SSD medium) at a point of time,
information 2583 showing the used capacity of the TIER 1 (SAS medium) at a point of time, and
information 2584 showing the used capacity of the TIER 2 (SATA medium) at a point of time.

The used capacity of each medium at each point of time is calculated by the segment IO evaluation program 2530. If four or more TIERs exist, the number of columns increases accordingly.

According to this table 2580, for example, in April of the year (x−1), considering the IOPS of each segment, it can be determined that the TIER 0 of 10 TB, the TIER 1 of 40 TB, and the TIER 2 of 200 TB are desirable. Note that the details of updating the capacity transition history table 2580 are described along with the description later of the processing of the segment IO evaluation program 2530.

The display (1) program 2550 shown in FIG. 7 displays a GUI (Graphical User Interface) and others on the output device such as a display device, requires the administrator to input the respective setting values, and outputs the performance results of the programs. Concrete examples of display will be shown in the description below.

Next, the hardware configuration of the host computer 3000 is described with reference to FIG. 1.

The host computer 3000, in addition to the above-mentioned communication IF 3300 and the management IF 3400, comprises a memory 3500, a disk 3200 which is an auxiliary storage unit, and a CPU 3100 coupled to the above.

Figure 11:
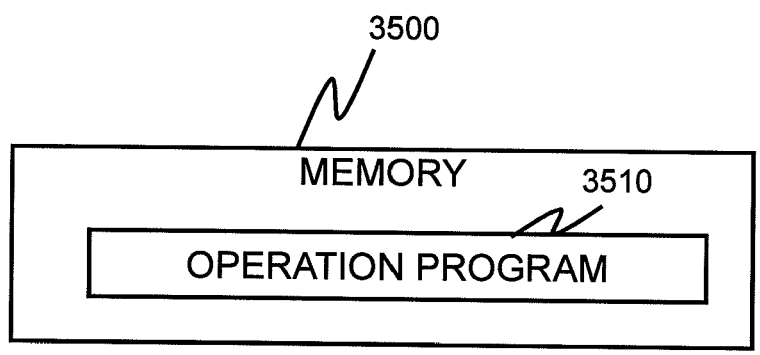
FIG. 11 shows a program existing in a memory 3500 in the host computer 3000 related to the Embodiment 1.

As shown in FIG. 11, in the memory 3500, as a computer program performed by the CPU 3100, for example, an operation program 3510 is stored. The operation program 3510 is, for example, a program managing the database and others, and the data stored in the database and others is stored in the pool via the VVOL.

The management computer 2000 and the host computer 3000 are, for example, a personal computer, a workstation, and others. In the memory (2500 and the memory 3500) of each computer, the cache memory for temporarily storing the OS (Operating System) and the data may be included. In addition, each computer, in addition to the above-mentioned configuration, may also comprise an input device such as a keyboard and an output device such as a display device. Furthermore, as for each computer, if all the data is stored in the storage apparatus 1000 or in other cases, the disk (2000 and 3000) does not have to exist.

<Description of Processing: Segment IO Evaluation Program 2530>

Figure 12:
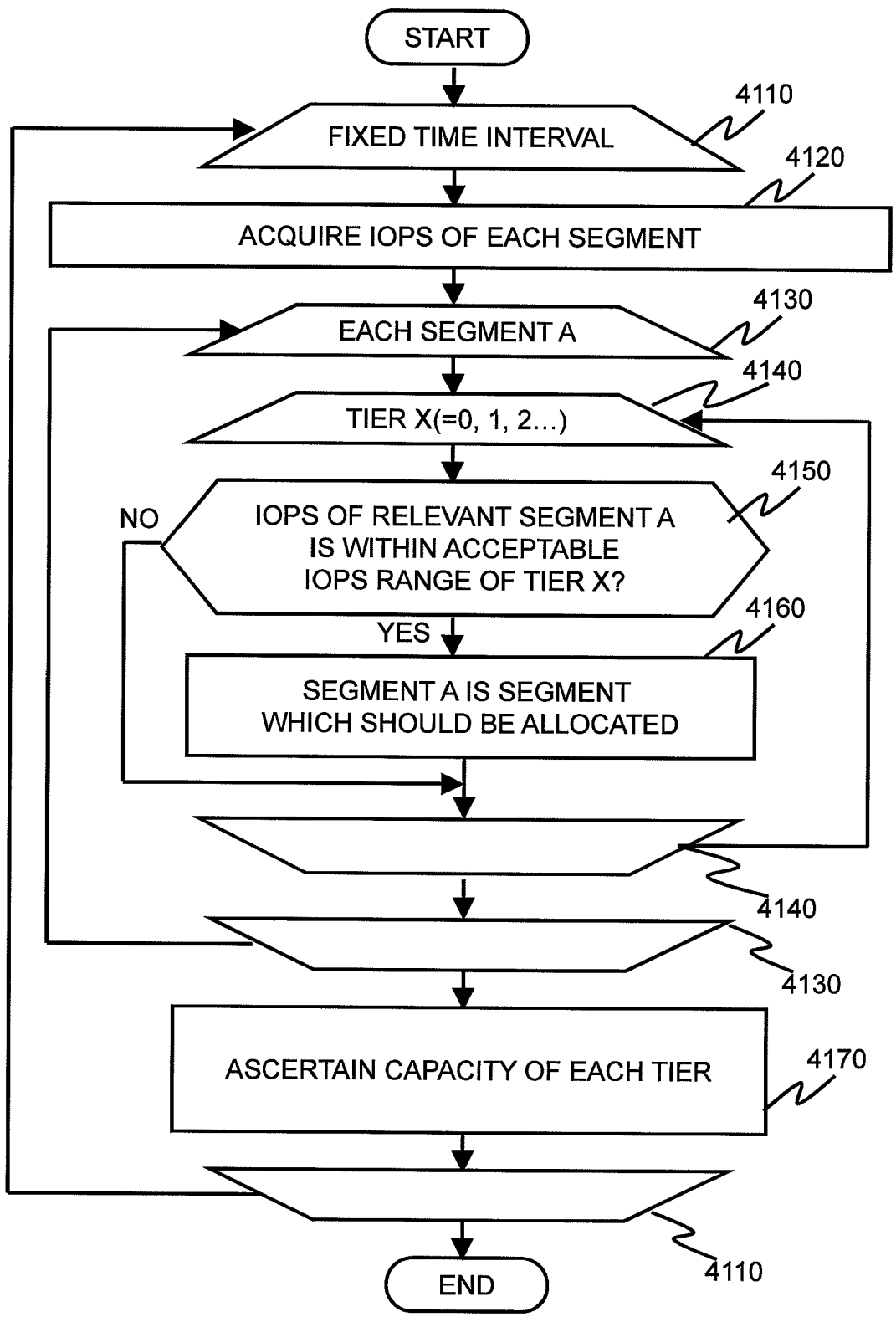
FIG. 12 is a flowchart of the processing of a segment IO evaluation program 2530.

FIG. 12 is a flowchart of the processing of the segment IO evaluation program 2530.

For example, at the time complying with the preset schedule or at the time specified by the administrator, the processing is started.

At the step 4110, the segment IO evaluation program 2530, at a fixed time interval, repeats the processing from the step 4120 to the step 4170. The "fixed time interval," for example, may be an interval of the time for starting segment migration performed by the segment migration program 1540 of the storage apparatus 1000 or an arbitrary time interval specified by the administrator.

At the step 4120, the program 2530 acquires the virtual volume management table 1570 from the storage apparatus 1000 via the configuration information acquisition program 2520.

At the step 4130, the program 2530, with reference to the virtual volume management table 1570 acquired at the step 4120, for each used segment A (segment already allocated to the VVOL), performs the processing from the step 4140 to the step 4160. Hereinafter, with reference to a used segment A as an example (referred to as a "target segment A" in the description of FIG. 12), the processing from the step 4140 to the step 4160 is described.

Firstly, the program 2530, for each TIER X (X=0, 1, . . . ) existing in the IOPS performance evaluation table 2570 (step 4140), determines whether the IOPS of the target segment A is within the acceptable IOPS range 2573 of the TIER X or not (step 4150).

If the result of the determination at the step 4150 is positive, the program 2530 increments the segment count value of the TIER X by 1 (step 4160). If the result of the determination at the step 4150 is negative, [the program 2530] returns to the step 4140, and the step 4150 is performed for the TIER (X+1). The segment count value indicates the number of used segments assuming an ideal data allocation complying with the IOPS performance evaluation table 2570.

The description is made below with reference to concrete examples. For example, the program 2530 determines whether the IOPS of a segment ID: 2001 (refer to FIG. 5) is within the acceptable IOPS range 2573 (refer to FIG. 9) of the TIER 0 or not. As the acceptable IOPS range 2573 of the TIER 0 is 501 or larger, the result of the determination is negative. Therefore, the program 2530 determines whether the IOPS of a segment ID: 2001 is within the acceptable IOPS range of the TIER 1 or not. As the result of the determination is positive, the program 2530 increments the segment count value of the TIER 1 by 1.

The processing from the step 4140 to the step 4160 is supposed to be performed for all the used segments.

Then, at the step 4170, the program 2530 converts the segment count value of each TIER (the ideal number of used segments in the TIER) into the capacity, and adds the same to the field for the current time in the capacity transition history table 2580. For example, if the segment count value of the TIER 0 in April of the year X is 220000, in this embodiment, considering that one segment is 100 MB, 22 TB is calculated as the ideal used capacity of the TIER 0 (the total storage capacity of the segments allocated to the virtual area). Hereinafter, by the same method for the TIER 1 and the TIER 2, the ideal used capacity in April of the year X is calculated, and the result is added to the record of April of the year X in the capacity transition history table 2580.

By a cancel instruction from the administrator, a termination of the segment migration program 1540, a termination of the capacity estimation (1) program 2540 or others (that is, at an arbitrary timing), the processing shown in FIG. 12 may be stopped.

<Description of Processing: Overview of Capacity Estimation (1)>

Figure 13:
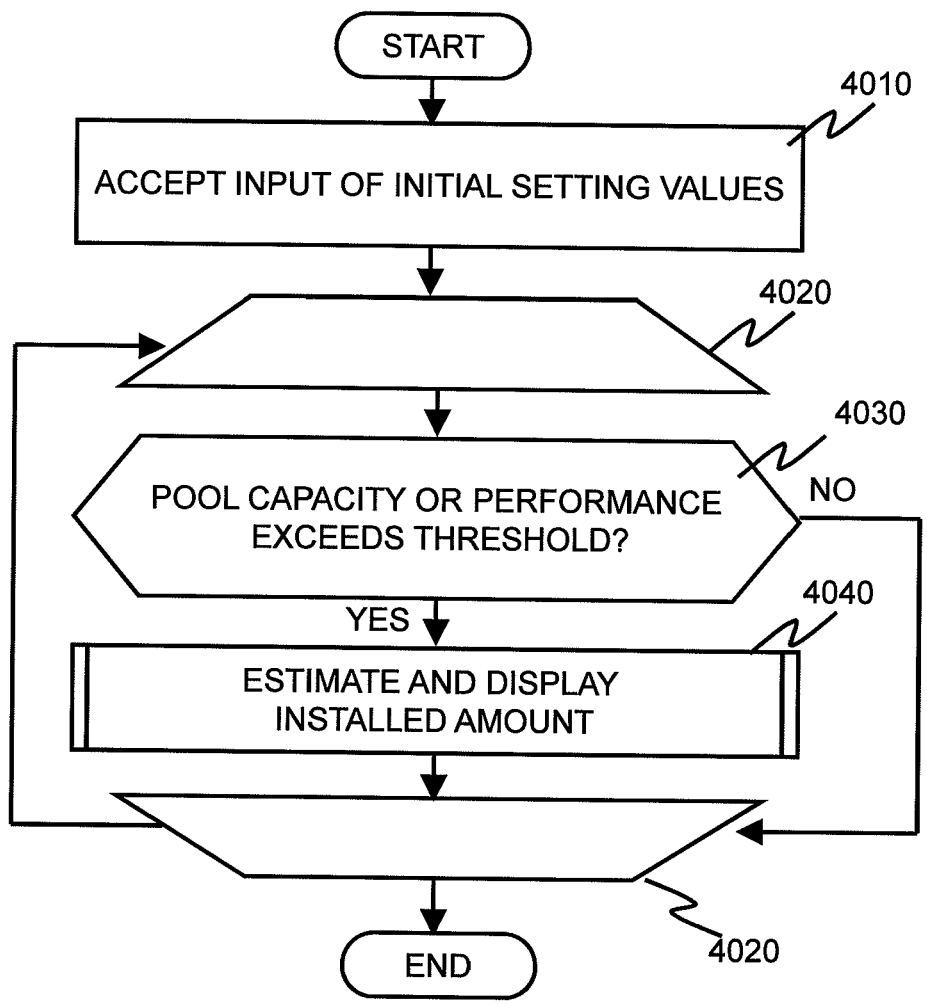
FIG. 13 is a flowchart of the processing of a capacity estimation (1) program 2540.

FIG. 13 is a flowchart of the processing of the capacity estimation (1) program 2540.

For example, at the time complying with the preset schedule or at the time specified by the administrator, this processing is started.

Firstly, at the step 4010, the capacity estimation (1) program 2540 accepts the input of a capacity threshold Th1, a target performance Th2, and an estimation period T from the administrator. The capacity threshold Th1 is the value compared with the used capacity of the pool (total storage capacity of the used segments). The target performance Th2 is the value compared with the pool performance (e.g. the average response time). The estimation period T is the value indicating which point of time of installed amount from the present to the future should be calculated. If the estimation period T is 1 month and the current time is April, 2009, the installed amount of May, 2009 is calculated. Note that, by setting a factory default value of at least one of the capacity threshold Th1, the target performance Th2, and the estimation period T, the step 4010 may be omitted. Furthermore, an example of the displayed GUI for inputting these initial values is described later.

After that, as shown by the step 4020, the processing of the step 4030 and the step 4040 is performed, for example, regularly.

At the step 4030, the program 2540, with reference to the pool status information acquired using the configuration information acquisition program 2520 (e.g. the virtual volume management table 1570) and the IOPS performance evaluation table 2570, calculates the used capacity and the performance of the pool (e.g. the average response time). The program 2540 determines whether the used capacity of the pool exceeds the capacity threshold Th1 or not and whether the performance of the pool exceeds the target performance Th2 or not.

If the result of the determination at the step 4030 is positive, as more specifically described, if the used capacity of the pool exceeds the capacity threshold Th1 or the performance of the pool falls below the target performance Th2 (e.g. if the average response time is a long time which exceeds the target performance Th2), the step 4040 is performed. That is, the program 2540 performs the display processing for the estimation and the result of the installed amount. This processing is described later with reference to FIG. 14.

In the loop shown by the step 4020, by a cancel instruction from the administrator or a termination of the segment migration program 1540 at an arbitrary timing, the processing of the capacity estimation (1) program 2540 may be stopped.

Figure 14:
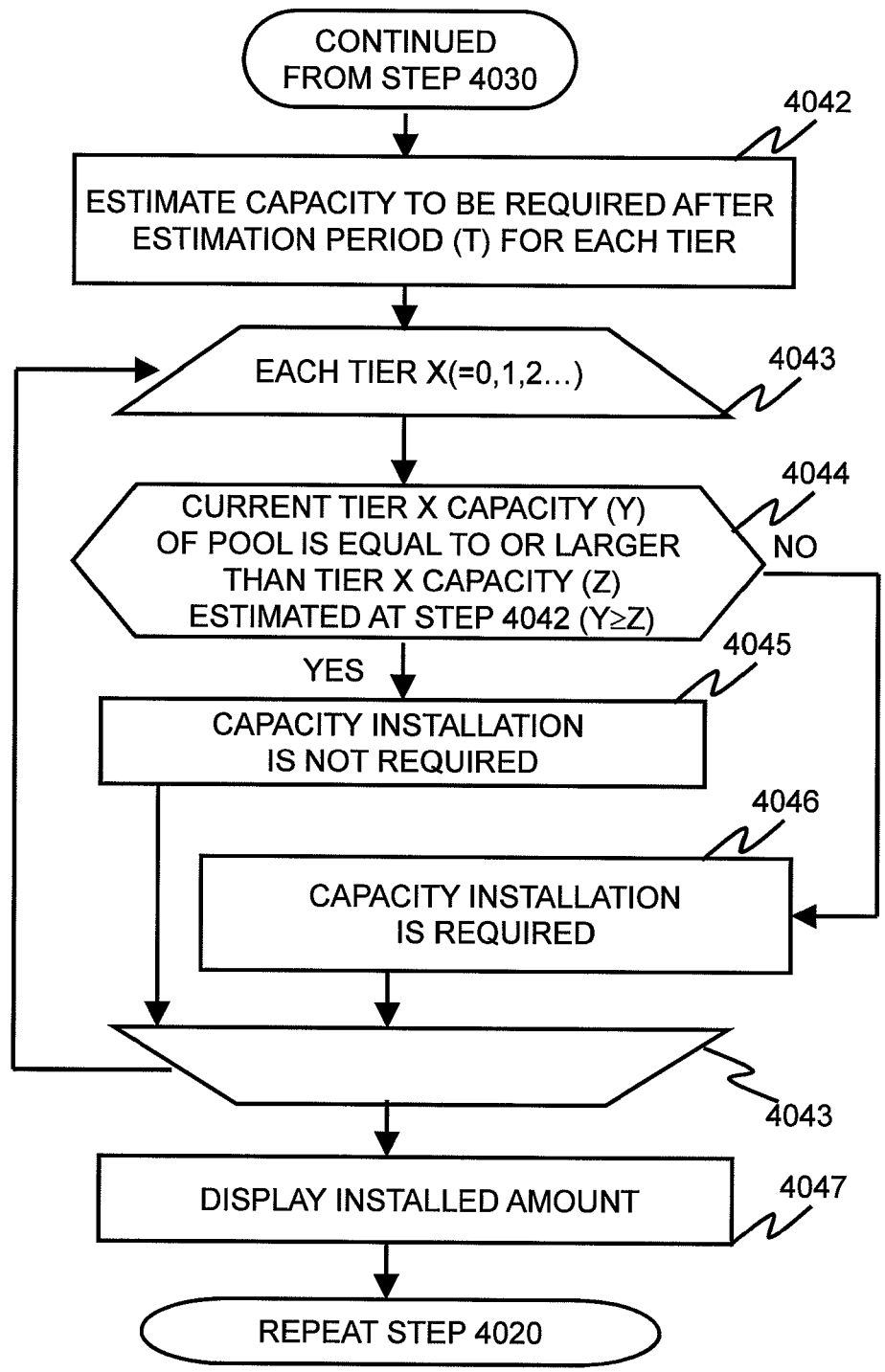
FIG. 14 is a flowchart of the processing at the step 4040 in FIG. 13.

FIG. 14 is a flowchart of the processing at the step 4040 in FIG. 13.

At the step 4042, the program 2540, with reference to the capacity transition history table 2580, calculates the increase rate of the used capacity of each medium. The program 2540, with reference to the increase rate of the used capacity of each medium, for the point of time after an estimation period T from the present, estimates the used capacity of each medium. The examples of estimation methods are described later.

As shown at the step 4043, for each medium (TIER X (X=0, 1, . . . )), the processing from the step 4044 to the step 4046 is performed. Hereinafter, with reference to a medium as an example (referred to as a "target medium" in the description of FIG. 14), the processing from the step 4044 to the step 4046 is described.

At the step 4044, the program 2540 determines whether the current capacity Y of the target medium is sufficient even after an estimation period T elapsed or not. As more specifically described, the program 2540, with reference to the pool capacity management table 2560, determines whether the capacity Y of the target medium (the capacity shown by the capacity 2560 of the target medium) is equal to or larger than the usage capacity Z estimated at the step 4042 (the used capacity of the target medium) or not.

If the result of the determination at the step 4044 is positive, the program 2540 determines that no installation of the capacity is required for the target medium (the installed amount for the target medium=0) (step 4045). Note that, at the step 4045, the program 2540 may also determine the installed amount for the target medium=(Z−Y). As the value of (Z−Y) is a negative value, as more specifically described, the program 2540 may also determine that the capacity (Y−Z) can be removed from the target medium.

Meanwhile, if the result of the determination at the step 4044 is negative, the program 2540 determines that the installed amount for the target medium=(Z−Y) (step 4046).

The above-mentioned processing from the step 4044 to the step 4046 is performed for each medium.

At the step 4047, the program 2540 makes the display (1) program 2550 display the installed amount determined for each medium. An example of the displayed GUI is described later. Note that, at the step 4047, instead of or in addition to displaying the determined installed amount of each medium, the program 2540 may perform the processing of automatically adding unused logical volumes in the storage apparatus 1000 (or the part of the unused logical volumes equivalent to the installed amount) to the medium corresponding to the types of the logical volumes.

A concrete example of the processing from the step 4042 to the step 4047 is described with reference to FIG. 15.

Figure 15:
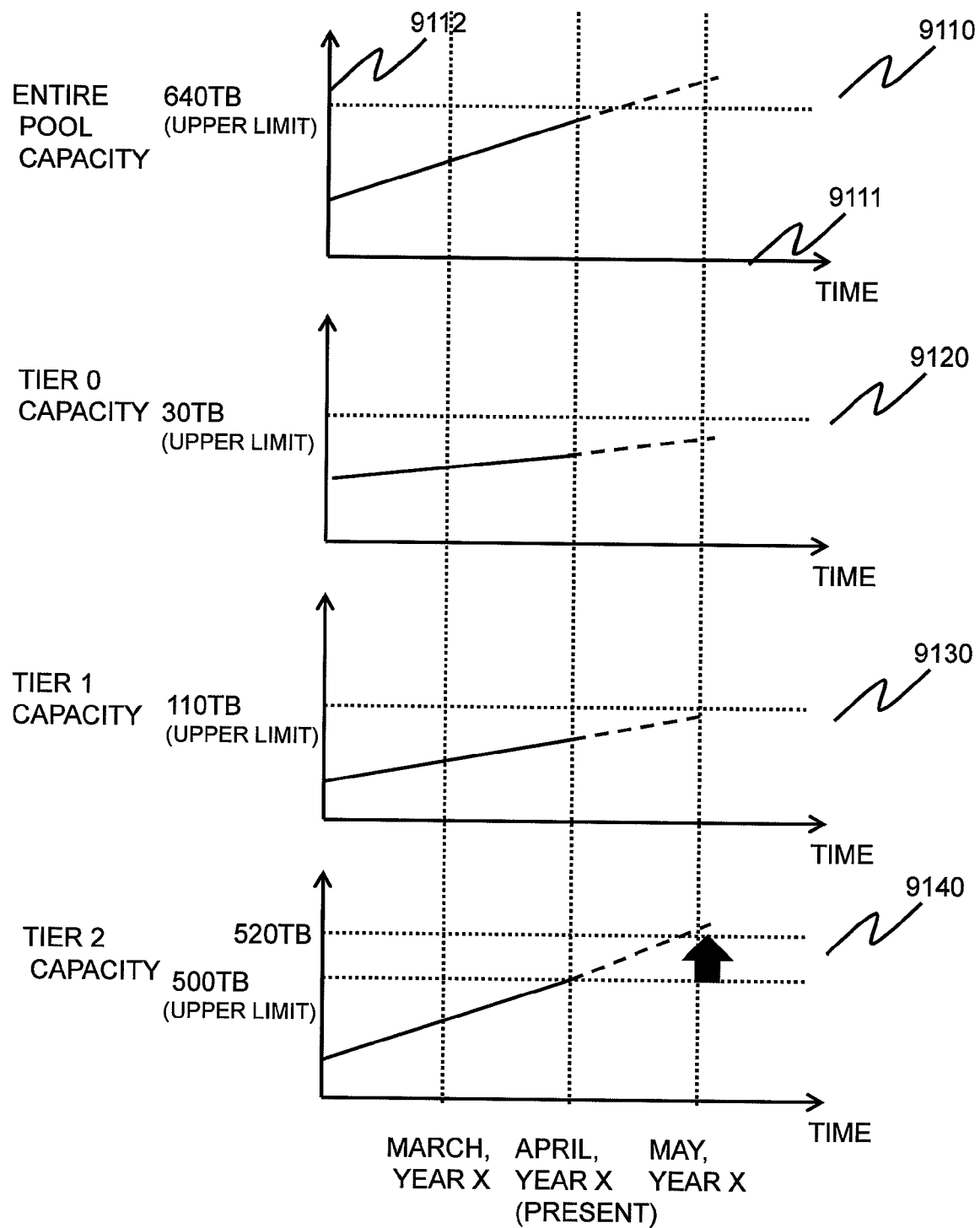
FIG. 15 is a set of graphs showing an example of estimation for the installed amount in the Embodiment 1.

As for each of the graphs 9110 to 9140 in FIG. 15, the horizontal axis 9111 shows the time and the vertical axis 9112 shows the capacity of the entire pool or each TIER. The graph 9110 is related to the capacity of the entire pool, the graph 9120 is related to the capacity of the TIER 0, the graph 9130 is related to the capacity of the TIER 1, and the graph 9140 is related to the capacity of the TIER 2. Furthermore, it is assumed that the current time is April of the year X and that the estimation period T=one month. If the usage capacity of the pool exceeds the capacity threshold Th1 (or if the performance of the pool falls below the target performance Th2), the processing described below is performed.

That is, the capacity estimation (1) program 2540, with reference to the capacity transition history table 2580 (refer to FIG. 10), can estimate the used capacity of one month later. For example, for estimating the capacity which will be required one month later by using linear function, the used capacity of the TIER 0 (more strictly, the ideal storage capacity) is, which increases by 1 TB per month, is estimated to be 23 TB one month later in May of the year X, which is 1 TB larger. For the TIER 1 and the TIER 2, by the same method, the used capacity in May of the year X can be estimated. Note that, in estimating linear function used for the estimation, by using a mathematical method such as least-square method, the increase rate (the increase rate of the used capacity) with little error can be calculated. Furthermore, in estimation, by using multidimensional function and others, the accuracy can be improved. As described above, if the used capacity (the ideal storage capacity) of each medium at each point of time can be acquired, the used capacity in the future can be estimated by an arbitrary method (that is, the method of estimation is not limited to the linear function, multidimensional function or others).

In some cases, the increase rate of the used capacity (the ideal storage capacity) identified by the capacity transition history table 2580 (refer to FIG. 10) has a periodic characteristic. For example, according to FIG. 10, the used capacity of the TIER 2 increases by 20 TB basically, but there are some cases such that a rapid increase is recognized only from April until May in the year (X−1). In that case, for estimating May of the year X, instead of the latest increase rate, using the increase rate of one year before might achieve more accurate estimation. For example, as for a pool including a VVOL which saves the information of a personnel management database of an ordinary company, the capacity is expected to increase rapidly around April and May when new employees join the company while little increase is expected in the other time of year. Therefore, the capacity estimation (1) program 2540 may ask the administrator for the determination whether to consider a periodic characteristic or not or the specification of a history data period used for estimation.

According to FIG. 15, as for May of the year X, the estimated used capacity (the estimated used capacity) Z of the TIER 0 does not exceed the capacity Y (30 TB) of the TIER 0, and the estimated used capacity Z of the TIER 1 does not exceed the capacity Y (110 TB) of the TIER 1. Therefore, for both the TIER 0 and the TIER 1, at the above-mentioned step 4045, as of May of the year X, it is determined that no installation is required (the installed amount=0).

However, as for the TIER 2, though the estimated used capacity Z is 520 TB, the current capacity Y of the TIER 2 is only 500 TB, and therefore, at the above-mentioned step 4046, the installed amount is determined to be (Z−Y)=20 TB.

Considering the above, at the step 4047, the result that no installation is required for the TIER 0 and the TIER 1 and that an installation of 20 TB is required for the TIER 2 is displayed. Note that, as for the TIER 0 and the TIER 1, the result that the capacity reduction for (Y−Z) is possible may also be displayed. Furthermore, it may also be determined that the capacity reduction is possible only in cases the value of (Y−Z) is equal to or larger than a specified value (e.g. the specified value is a value larger than zero).

<Display Example>

Figure 16:
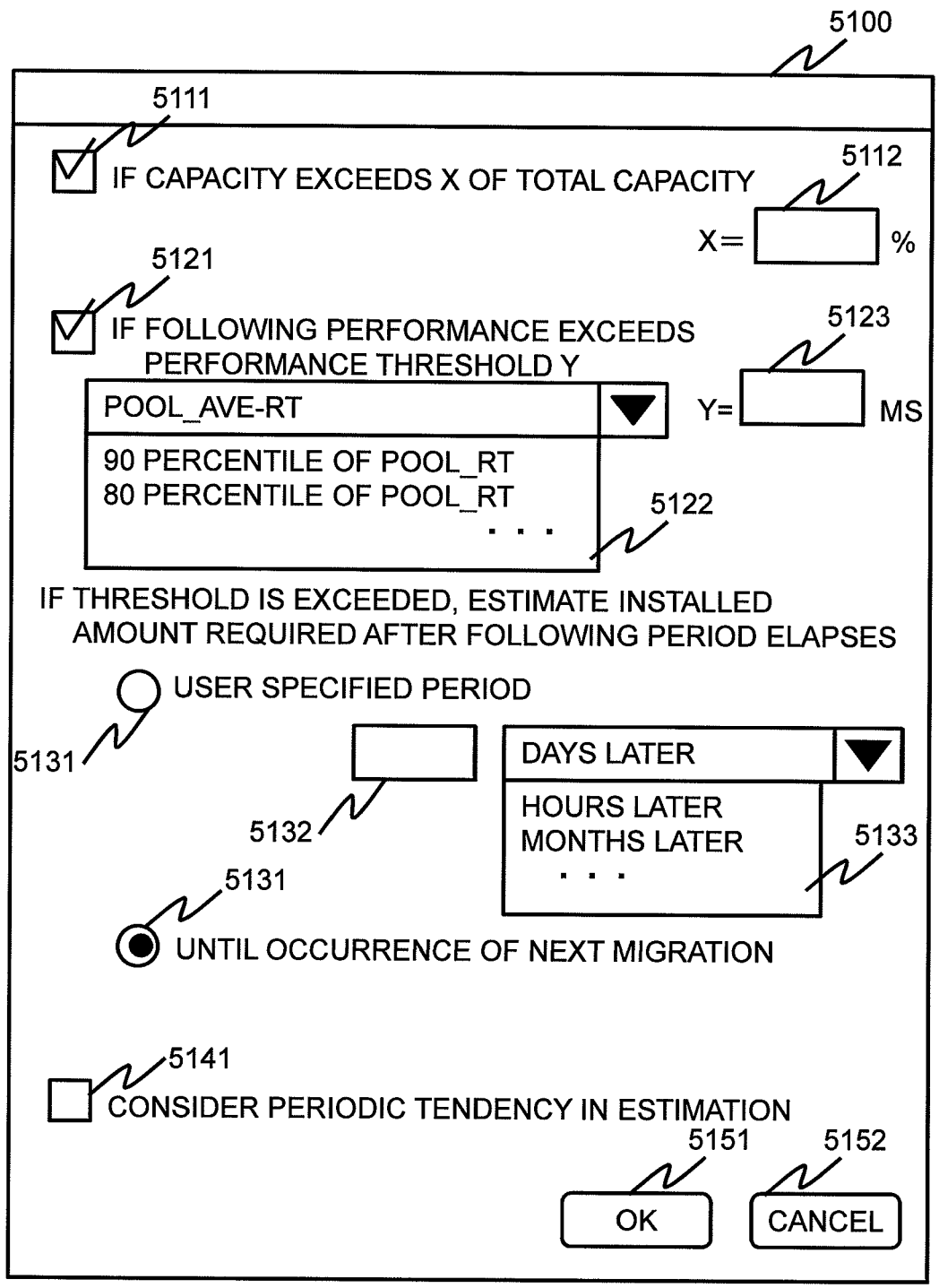
FIG. 16 shows an example of a GUI 5100 displayed at the step 4010 in FIG. 13.

FIG. 16 shows an example of a GUI 5100 displayed by the display (1) program 2550 at the step 4010 in FIG. 13.

The GUI 5100 is a GUI which requires the administrator to input respective setting values. The GUI 5100 comprises a text box 5112 for inputting the capacity threshold Th1, a combo box 5122 for selecting the type of the target performance to be monitored as the target performance Th2, and a text box 5123 for inputting the target performance Th2. Furthermore, [the GUI 5100] may also comprise check boxes 5111 and 5121 for selecting whether to monitor the capacity and the performance. At this point, options for the target performance 5122 are, an average response time of the pool, a percentile value, and others. The average response time is an average value of the response time per IO (one access from the controller 1100 to the segment). Furthermore, for example, 80 percentile value of the response time equal to P is the value indicating that the 80% of the total response time (the response time per IO) is equal to or smaller than P. In addition, the GUI 5100, for inputting the estimation period T, comprises a text box 5132 and a combo box 5133 for selecting the unit of period. In addition, [the GUI 5100] may also comprise a radio button 5131 for selecting whether the user inputs [the value] directly or uses the value of an appropriate period which the user comprises, for example, the interval of segment migration. As well as the above, [the GUI 5100] may also comprise a check box 5141 for selecting whether to add a periodic estimation to the estimation or not and a text box for specifying an estimation period. Furthermore, [the GUI 5100] may also comprise a button 5151 for entering the input, a button 5152 for cancelling the same and others.

If a K percentile value of the response time is specified as Vms (millisecond) and if the sum of the IOPS of all the used segments of all the media whose assumed response times are equal to or smaller than Vms falls below K percent of the sum of the IOPS of all the used segments of the pool, YES is selected at the step 4030 in FIG. 13. That is, if the number of segments whose assumed response times are equal to or smaller than Vms increases (that is, the percentage of segments using high-performance media), the performance improves overall. Meanwhile, if the percentage of segments whose assumed response times falls below K percent (that is, the number of segments whose assumed response times are equal to or larger than Vms increases), the performance is deteriorated overall. Note that, if a storage monitors an actual measured response time value occurring in a C-IF since a read request [is issued] until data is actually returned and if the number of times of read requests whose response time is equal to or smaller than Vms in an arbitrarily specified period of time exceeds K percent, YES may be selected at the step 4030. Furthermore, the response time may also be an actual measured value.

Figure 17:
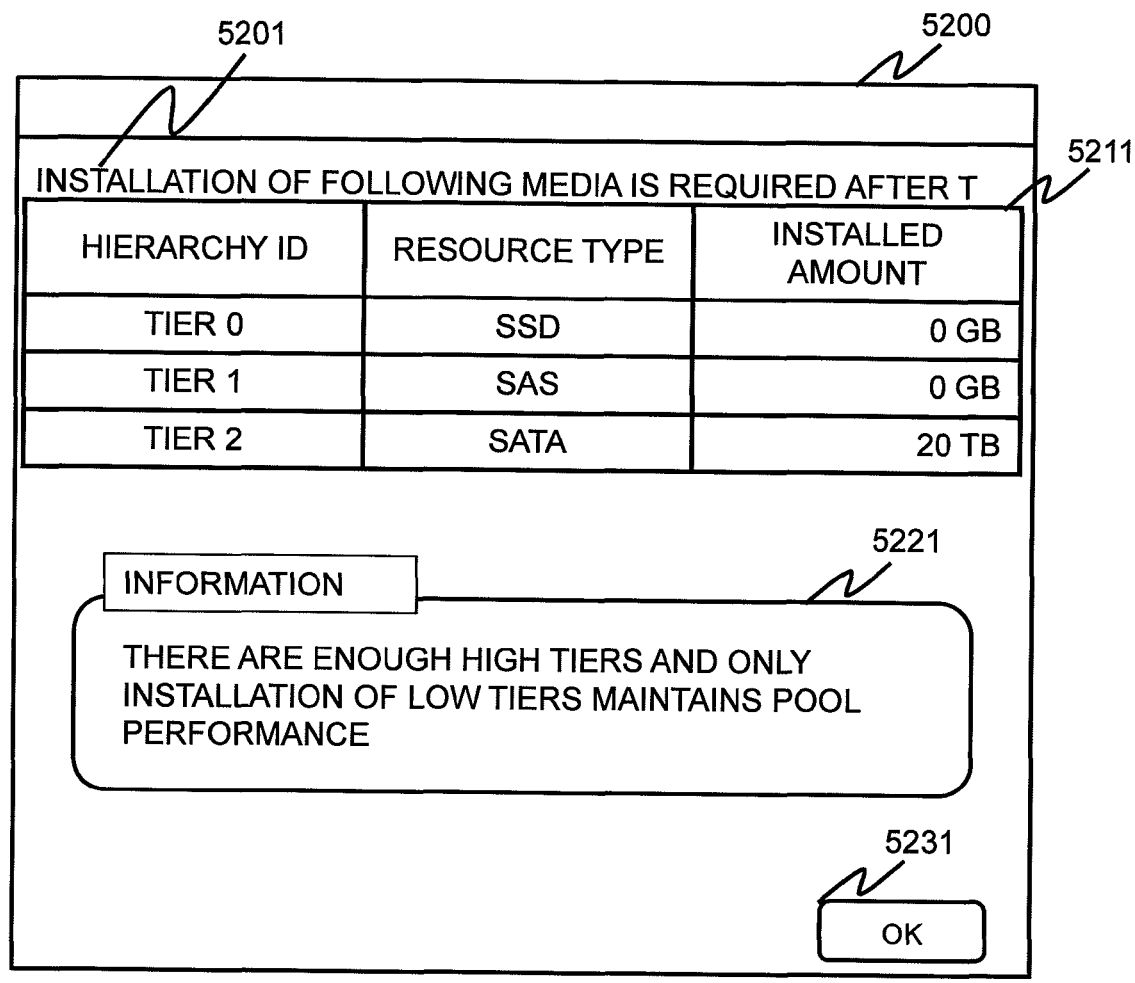
FIG. 17 shows an example of a GUI 5200 displayed at the step 4047 in FIG. 14.

FIG. 17 shows an example of a GUI 5200 displayed at the step 4047 in FIG. 14.

The GUI 5200 is a GUI for notifying an installed amount required for each TIER to the administrator. The GUI 5200 displays a text 5201 showing that the displayed item is an estimation after an estimation period T and comprises a table 5211 for displaying respective installed amounts. The table 5211 shows the installed amount required for each TIER and a corresponding resource. Furthermore, instead of the table 5211, a list of logical volumes which can be used in the storage apparatus and satisfies the installed amount may also be displayed. Furthermore, [the GUI 5200] may also comprise a button 5231 used by the administrator to close the GUI 5200 as they understand the contents above.

In addition, as for the GUI 5200, in an Information area 5221, a text describing that the installed amount shown in the table 5211 is required may also be displayed. For example, with reference to whether to install any storage capacity (logical volumes) to a higher TIER or not as a criteria, the text displayed on the Information area 5221 may be determined as below. Firstly, whether the installed amount of the TIER 0 which is the highest TIER is 0 or not is determined and, if the installed amount of the TIER 0 is 0, a text that there are enough high-performance TIERs and that the performance is high enough only with an installation of low-performance TIERs may be displayed. Meanwhile, if an installation of the TIER 0 is required, that is, if the installed amount is not 0, a text that the area which is accessed highly frequently is expanded and that an installation of high-performance TIERs is required for maintaining the performance may be displayed. Even if three or more types of TIERs exist in the pool, after classifying the TIERs with reference to whether [each TIER is] a highest TIER or not or in the perspective of the cost for installation, the above-mentioned processing may be applied. By this method, a text (statement) to be displayed on the Information area 5221 can be determined.

Embodiment 2

The Embodiment 2 of this invention is described below. At this point, the differences from the Embodiment 1 are mainly described while the description of what is common to the Embodiment 1 is omitted or simplified.

<Overview>

In the Embodiment 1, by using the previously prepared IOPS evaluation table 2560, the increase rate of the used capacity of each medium is calculated and, with reference to the increase rate of the used capacity of each medium, an installed amount of each medium is calculated.

In the Embodiment 2 of this invention, with reference to the target performance and the cost for the installed capacity of a medium (hereinafter referred to as an installation cost), the installed amount which achieves the performance equal to or higher than the target and whose installation cost is lowest is determined.

<Description of Configuration>

The physical configuration of the storage system related to the Embodiment 2 may be the same as the configuration shown in FIG. 1. The programs stored in the memory 2500 in the management computer 2000 are different from the programs of the Embodiment 1.

Figure 18:
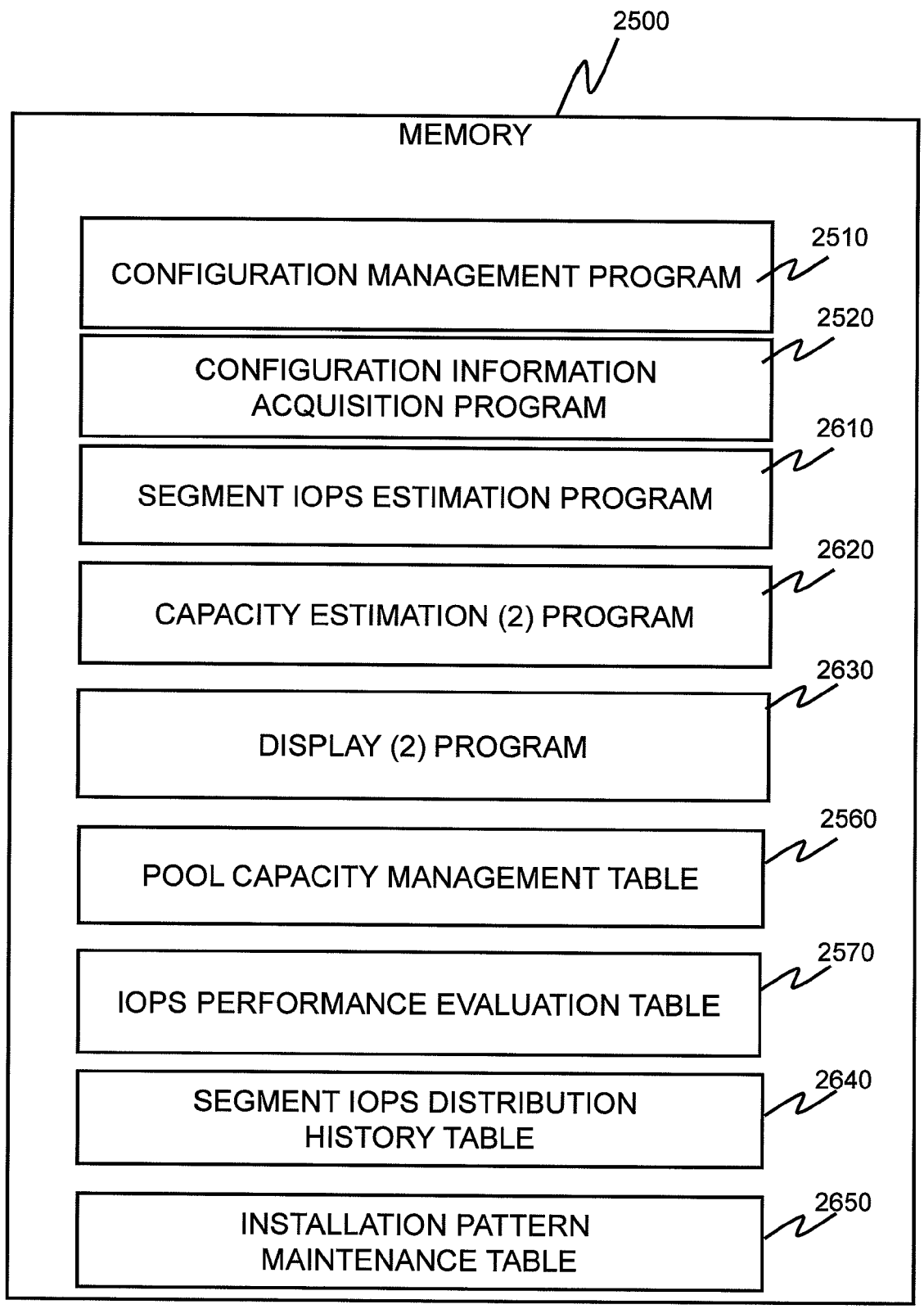
FIG. 18 shows programs and information stored in a memory 2500 in the management computer 2000 related to the Embodiment 2.

FIG. 18 shows the programs and the information stored in the memory 2500 related to the Embodiment 2.

The configuration management program 2510, the configuration information acquisition program 2520, the IOPS performance evaluation table 2570, and the pool capacity management table 2560 are the same as in Embodiment 1. However, in the IOPS performance evaluation table 2570, the acceptable IOPS range 2573 does not have to be included, but the assumed response time 2574 must be included.

In addition to the above-mentioned programs and information, the memory 2500 related to the Embodiment 2 stores a segment IOPS estimation program 2610 estimating the transition of the number of segments of each IOPS, a capacity estimation (2) program 2620 estimating the installed amount of each TIER which will be required in the future, a display (2) program 2630 displaying a GUI for inputting initial setting values and a GUI for notifying an installed amount, a segment IOPS distribution history table 2640, and an installation pattern maintenance table 2650. However, the installation pattern maintenance table 2650 is a table which is used conveniently, and only has to be stored temporarily.

FIG. 19 shows an example of the segment IOPS distribution history table 2640.

The segment IOPS distribution history table 2640 shows the distribution of the number of used segments based on the IOPS. As more specifically described, for example, the horizontal axis of the table 2640 shows the IOPS 2643 while the vertical axis shows the time 2641, and each cell 2644 which is an intersection of a row and a column stores information showing the number of segments. For example, it can be calculated that the number of segments whose IOPS is 100 in April of the year X is 6200. Meanwhile, the estimated number of segments of each IOPS (the number of estimated segments) 2645 at a point of time 2642 in the future is conveniently expressed as an n[number of IOPS]. Note that the number of IOPS 2643 may also be counted, as well as one by one, in units of specified ranges (e.g. in units of 10 IOPS). Furthermore, the method of creating and updating the segment IOPS distribution history table 2640 is described in the flow of the processing of the segment IOPS estimation program which is described later.

Figure 20:
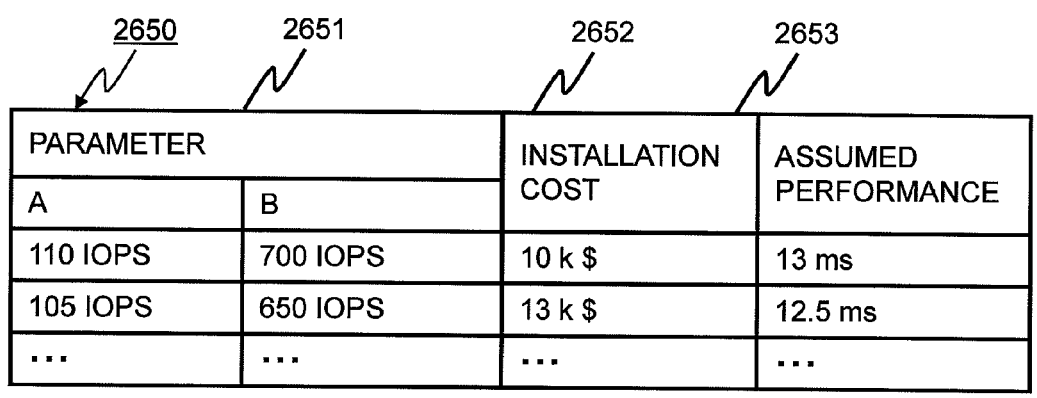
FIG. 20 shows an example of an installation pattern maintenance table 2650.

FIG. 20 shows an example of the installation pattern maintenance table 2650.

The installation pattern maintenance table 2650 comprises the information related to capacity installation patterns. As more specifically described, the table 2650, for each installation pattern, comprises the information described below, a parameter 2651 showing the parameter related to the rate of each medium, an installation cost 2652 showing the installation cost occurring if the pool capacity is installed for achieving the parameter 2651, and an assumed performance 2653 showing the performance expected at that time.

The concrete method of calculating and utilizing the parameter and the installation cost is described in the flow of the processing of the capacity estimation (2) program 2620 which is described later.

At this point, the meaning of the parameters is described with reference to FIG. 21.

Figure 21:
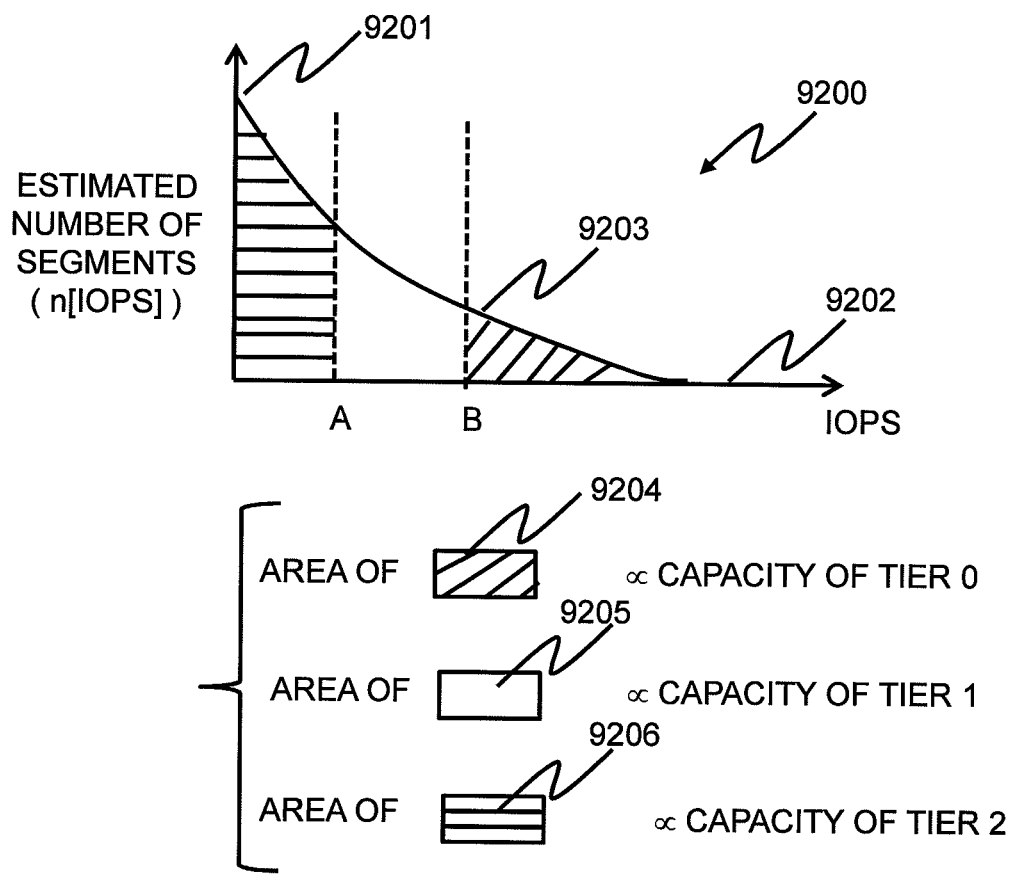
FIG. 21 shows a graph describing the meaning of the parameters in the Embodiment 2.

In the graph 9200 shown in FIG. 21, the horizontal axis 9202 shows the IOPS, and the vertical axis 9201 shows the number of segments. The curve 9203 shows the number of segments of each IOPS 9202.

The parameters are A and B (A<B). The two parameters A and B are for defining a media to allocate data in the segment of each IOPS.

As more specifically described, the data in the segments whose IOPSs are equal to or smaller than A is allocated to the TIER 2, the data in the segments whose IOPSs are equal to or larger than B is allocated to the TIER 0, and the data in the segments whose IOPSs are larger than A and smaller than B is allocated to the TIER 1. In this case, the number of segments which should be allocated to the TIER 0 is expressed by the area of a region 9204, the number of segments which should be allocated to the TIER 1 is expressed by the area of a region 9205, and the number of segments which should be allocated to the TIER 2 is expressed by the area of a region 9206. Note that cases in which there are four or more TIERs can be handled by increasing the number of parameters to 3 or more.

Furthermore, in this Embodiment 2, the installation cost 2652 shown in FIG. 20 is shown as an amount of money required for capacity installation. However, the installation cost is not limited to the amount of money, and may also be the amount of power consumption which is increased by an installation. The assumed performance 2653 is an assumed average response time which is calculated from the assumed response time 2574 of the IOPS performance evaluation table 2570 and the IOPS of the segments which should be allocated to each TIER. That is, the assumed performance 2653 can be calculated by the expression below, (assumed performance 2653)={(1 ms(millisecond)× (Sum of IOPS in segments classified as TIER 0 in FIG. 20)+10 ms×(Sum of IOPS in segments classified as TIER 1 in FIG. 20)+100 ms×(Sum of IOPS in segments classified as TIER 2 in FIG. 20)}÷(Total IOPS of all segments).

As well as this, the assumed performance may also be a percentile value of the response time. Furthermore, the assumed response time can be calculated by the above-mentioned method even if there are three or more types of TIERs.

<Description of Processing: Segment IOPS Estimation>

Figure 22:
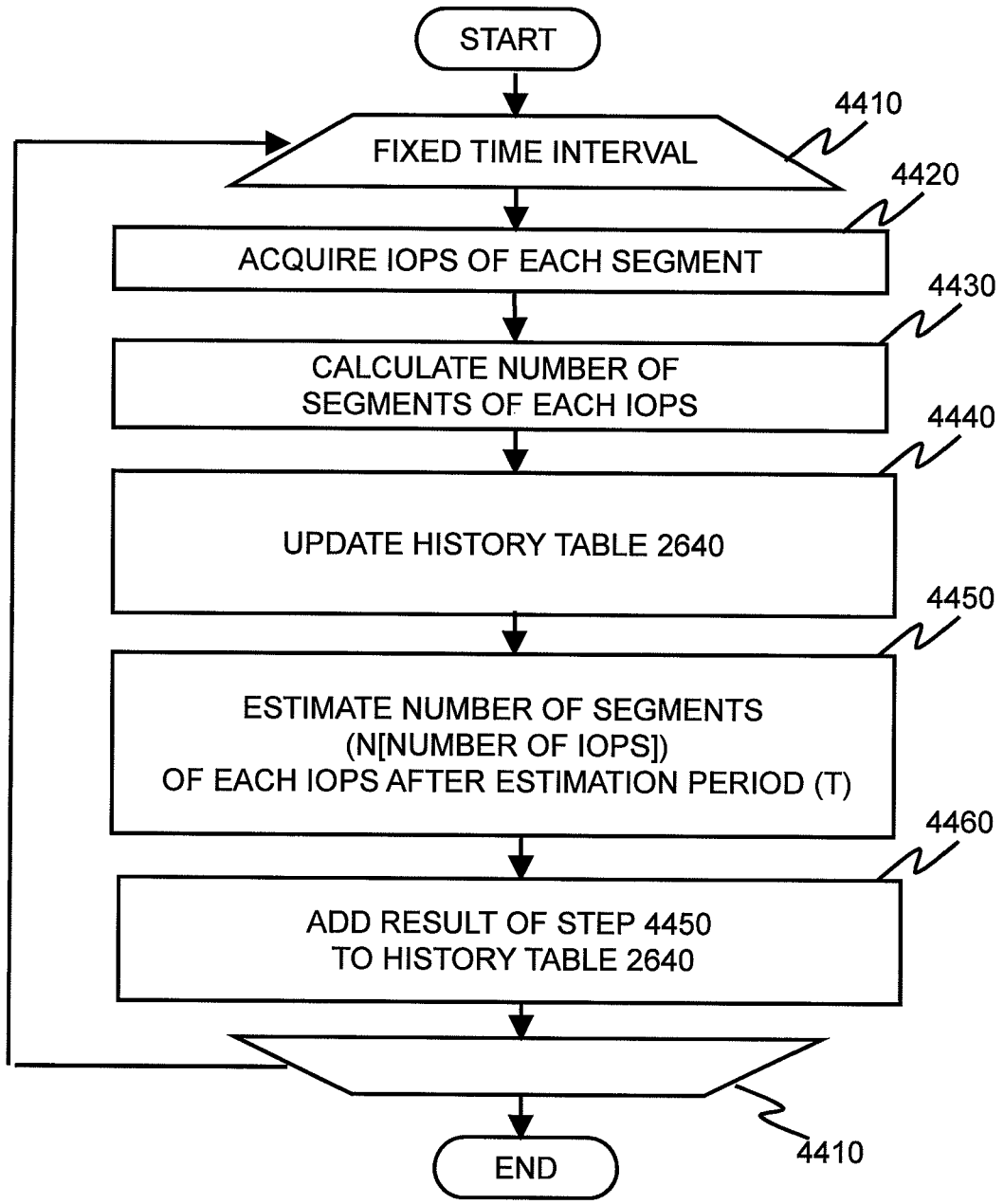
FIG. 22 shows a flowchart of the processing of a segment IOPS estimation program 2610.

FIG. 22 shows a flowchart of the processing of the segment IOPS estimation program 2610.

For example, at the time complying with the preset schedule or at the time specified by the administrator, the processing is started.

As shown by the step 4410, the segment IOPS estimation program 2610, at a fixed time interval, repeats the processing from the step 4420 to the step 4460. Note that the "fixed time interval" referred to herein, for example, may be an interval of the time for starting segment migration performed by the segment migration program 1540 or an arbitrary time interval specified by the administrator.

At the step 4420, the program 2610, using the configuration information acquisition program 2520, acquires the virtual volume management table 1570 from the storage apparatus 1000.

Next, at the step 4430, the program 2610, with reference to the IOPS 1576 of the acquired virtual volume management table 1570, counts the number of segments of each IOPS. Then, at the step 4440, the program 2610 using the number of segments of each IOPS counted at the step 4430, updates the segment IOPS distribution history table 2640. Note that, as described above, the number of segments may also be counted in units of IOPS ranges.

At the step 4450, the program 2610, using the segment IOPS distribution history table 2640 updated at the step 4440, estimates the number of segments of each IOPS after an estimation period T specified by the capacity estimation (2) program which is described later. At the step 4460, the program 2610 adds the estimation result to the segment IOPS distribution history table 2640.

For example, according to the segment IOPS distribution history table 2640 shown in FIG. 19, if the current time is April of the year X, the number of segments whose IOPS is 100 increases by 100 per month. If an estimation based on linear function is performed as at the step 4042 in FIG. 14, the estimated value for the number of segments n[100] of May of the year X which is one month later is estimated to be 6300. For the estimation methods, as the Embodiment 1, various types of estimation methods such as using multidimensional function, not only linear function, can be considered. As described above, n[number of IOPS] which is an estimated value 2645 for the number of segments can be calculated.

By a cancel instruction from the administrator, a termination of the segment migration program 1540, a termination of the segment IOPS estimation program 2610 or others (that is, at an arbitrary timing), the processing shown in FIG. 22 may be stopped.

<Description of Processing: Capacity Estimation (2) Program>

Figure 23:
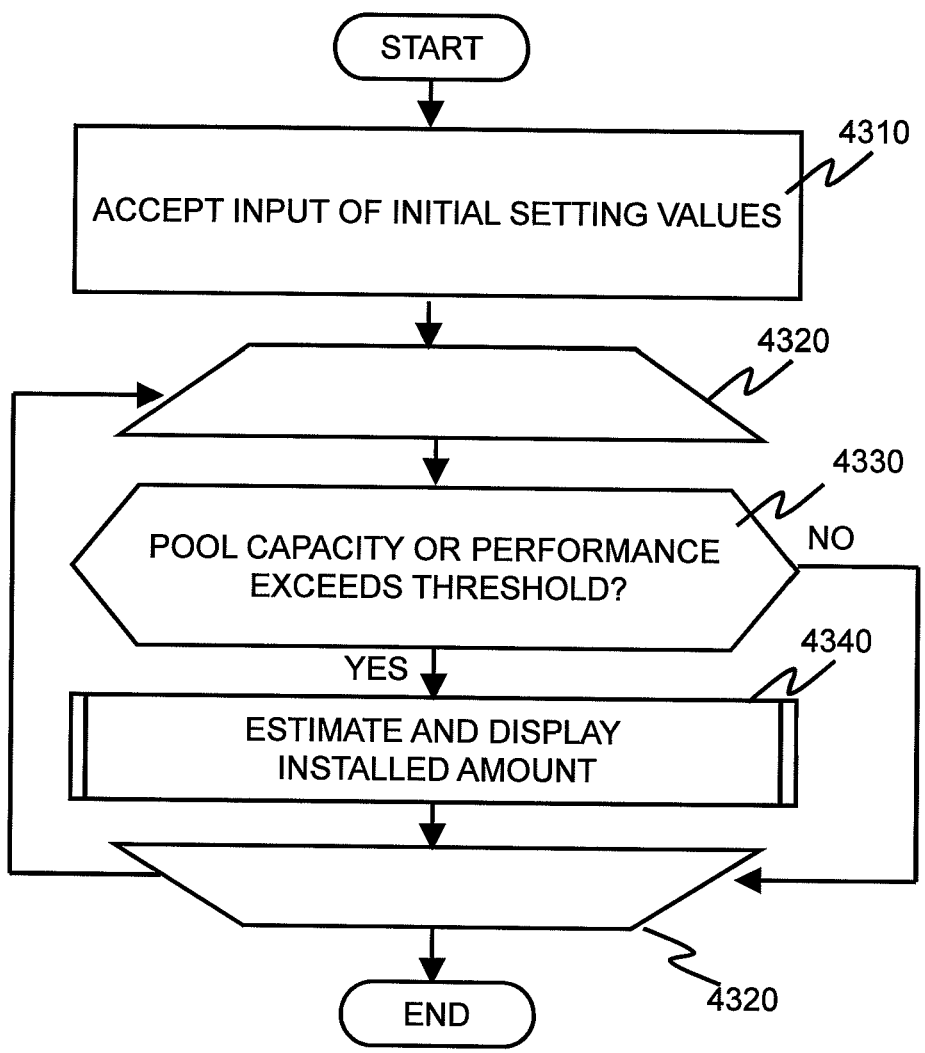
FIG. 23 shows a flowchart of the processing of a capacity estimation (2) program 2620.

FIG. 23 shows a flowchart of the processing of the capacity estimation (2) program 2620.

For example, at the time complying with the preset schedule or at the time specified by the administrator, the processing is started.

Firstly, at the step 4310, the capacity estimation (2) program 2620 requires the administrator to input a capacity threshold Th1, a target performance Th2, and an installation cost C per unit capacity occurring when installing a medium of each TIER. In addition, the program 2620 asks for the input of an estimation period T. Then, the program 2620 notifies the input estimation period T to the segment IOPS estimation program 2610. Note that, by setting factory default values of the capacity threshold Th1, the target performance Th2, the installation cost C, and the estimation period T, the step 4310 may be omitted. Furthermore, the installation cost C is assumed to indicate the cost or the amount of power consumption when installing a medium per unit capacity.

As shown by the step 4320, the processing of the step 4330 and the step 4340 is performed, for example, regularly.

At the step 4330, the program 2620, with reference to the pool status information acquired using the configuration information acquisition program 2520 (e.g. the virtual volume management table 1570) and the installation pattern maintenance table 2650, calculates the used capacity and the performance of the pool (e.g. the average response time). The program 2540 determines whether the used capacity of the pool exceeds the capacity threshold Th1 or not and whether the performance of the pool exceeds the target performance Th2 or not.

If the result of the determination at the step 4330 is positive, as more specifically described, if the used capacity of the pool exceeds the capacity threshold Th1 or the performance of the pool falls below the target performance Th2 (e.g. if the average response time is a long time which exceeds the target performance Th2), the step 4340 is performed. That is, the program 2620 performs the estimation of the installed amount and the display processing of the result. This processing is described later with reference to FIG. 24.

In the loop shown by the step 4320, by a cancel instruction from the administrator or a termination of the segment migration program 1540 at an arbitrary timing, the processing of the capacity estimation (2) program 2620 may be stopped.

Figure 24:
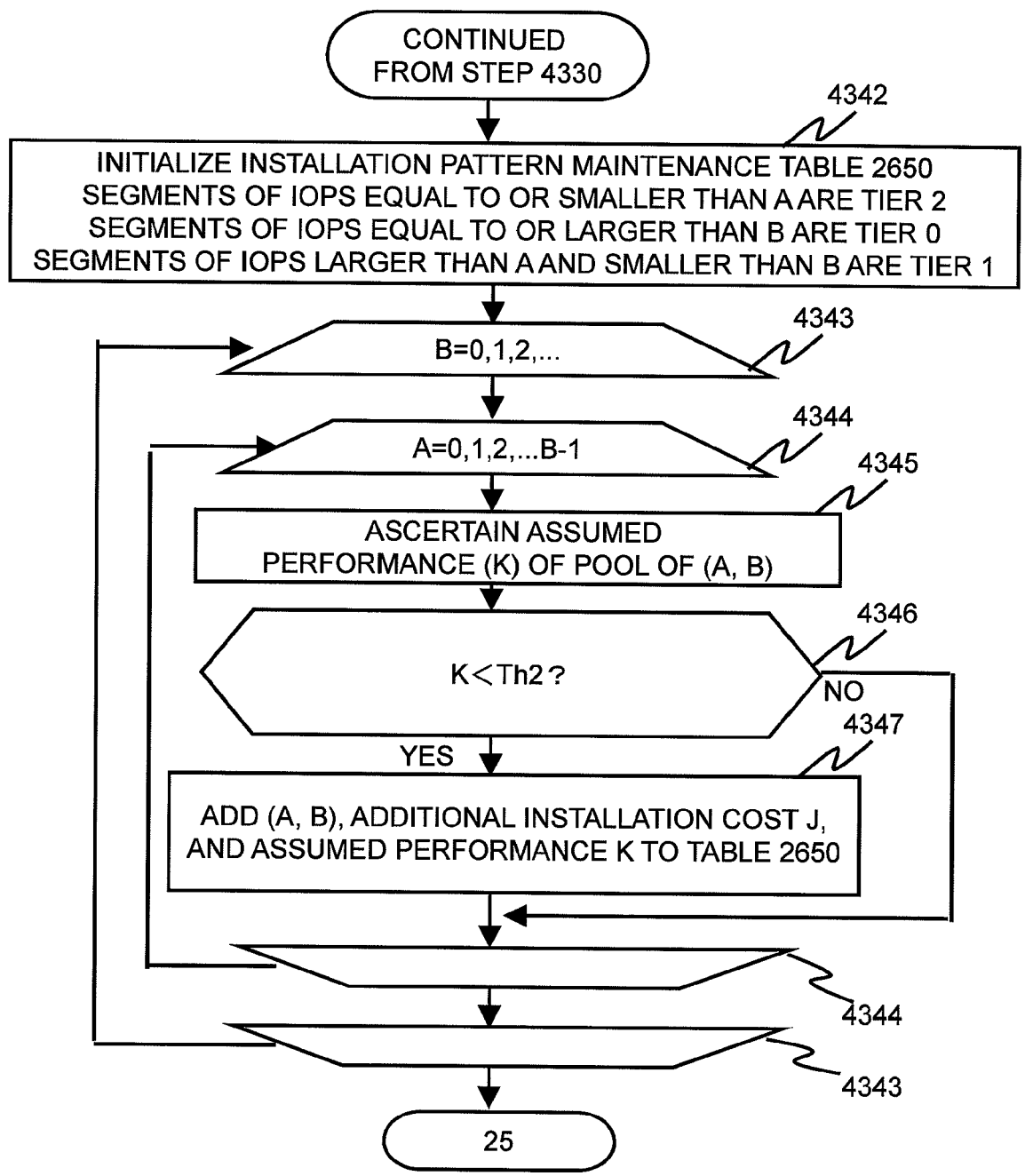
FIG. 24 shows a flowchart of a part of the processing at the step 4340 in FIG. 23.
Figure 25:
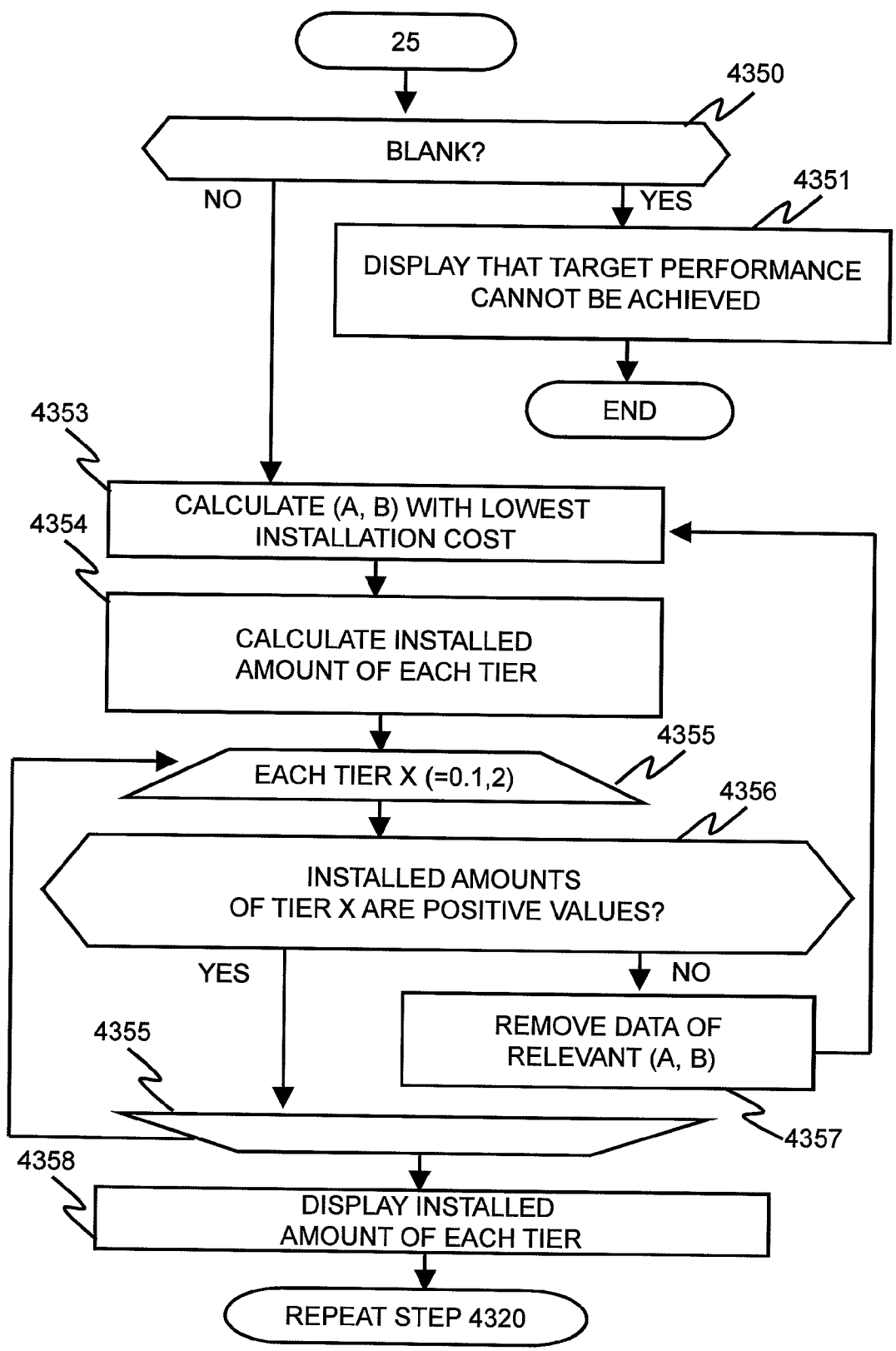
FIG. 25 shows a flowchart of the remaining processing at the step 4340 in FIG. 23.

FIGS. 24 and 25 are the flowcharts of the processing at the step 4340 in FIG. 23. At this point, a case of three types of TIERs is assumed to be described. Note that, even if there are four or more types of TIERs, the same calculating is possible by increasing the above-mentioned number of parameters.

At the step 4342, the capacity estimation (2) program 2620 initializes (makes blank) the installation pattern maintenance table 2650. In addition, the program 2620, using the parameters A and B, classifies the number of segments which should be allocated to the respective TIERs.

The steps 4343 and 4344 show that, for all sets of (A, B) which satisfies a condition that A is smaller than B (A<B), the processing from the step 4345 to the step 4347 is performed. Hereinafter, with reference to a set of (A, B) as an example (hereinafter referred to as the "target (A, B)" in the description of FIG. 24), the processing from the step 4345 to the step 4347 is described.

At the step 4345, the program 2620 calculates an assumed performance K of the pool based on the target (A, B) with reference to the IOPS performance evaluation table 2560 and the estimated number of segments of each IOPS 2645 in the segment IOPS distribution history table 2640. For example, if the assumed performance is the average response time of the pool, the assumed performance K can be calculated as described with reference to FIG. 21, assumed performance={(1 ms(millisecond)×(Sum of IOPS in segments classified as TIER 0 in FIG. 20)+10 ms×(Sum of IOPS in segments classified as TIER 1 in FIG. 20)+100 ms×(Sum of IOPS in segments classified as TIER 2 in FIG. 20)}+(Total IOPS of all segments).

Next, at the step 4346, the program 2620 determines whether the assumed performance K calculated at the 4345 is higher than the target performance Th2 (that is, K<Th2) or not.

If the result of the determination at the step 4346 is negative, the program 2620 performs the processing of the step 4345 and later for a next set of (A, B).

Meanwhile, if the result of the determination at the step 4346 is positive, the program 2620 adds the target (A, B), the assumed performance K, and an installation cost J which can be calculated from the target (A, B) to the installation pattern maintenance table 2650. Then, the processing of the step 4345 and later is performed for a next set of (A, B).

At this point, the installation cost J can be calculated by using the installation cost C of each medium set at the step 4310. As more specifically described, the expression below [is used], installation cost J=(TIER 0 installation cost)×(TIER 0 installed amount)+(TIER 1 installation cost)×(TIER 1 installed amount)+(TIER 2 installation cost)×(TIER 2 installed amount).

At this point, for example, the installed amount of the TIER 0 can be calculated by the expression below, ((Area of region 9204 in FIG. 21)×100 MB)−(capacity of TIER 0 in pool capacity management table 2560).

The installed amounts of the TIER 1 and the TIER 2 can be calculated by the same method. Note that, if whether the installed amount is a positive value or not is all that is concerned, the TIERs whose installed amounts are negative values may be excluded from the expression for the installation cost J.

After the loop shown at the steps 4343 and 4344 is performed for all the sets of (A, B), the processing shown in FIG. 25 is performed.

At the step 4350, the program 2620 determines whether the installation pattern maintenance table 2650 is blank or not.

If the result of the determination at the step 4350 is negative, it can be calculated that no installation pattern which achieves the target performance exists. Therefore, as shown by the step 4351, the program 2620, using the display (2) program 2630, displays the GUI which requires the reconfiguration of the target performance and others. Otherwise, the processing at the 4341 and later may also be performed again.

Meanwhile, if the result of the determination at the step 4350 is negative, at the step 4353, the program 2620 calculates the set of (A, B) (that is, the set of parameters) with the lowest installation cost from the installation pattern maintenance table 2650.

Next, at the step 4354, the program 2620, using the set of (A, B) calculated at the step 4353, from the estimated number of segments 2645, calculates the used capacity of each TIER at a point of time after the estimation period T. Then, the program 2620, with reference to the used capacity of each TIER (estimated value) and the current used capacity of each TIER, calculates the installed amount of each TIER as described with reference to FIG. 21.

Then, at the step 4355 and the step 4356, the program 2620 determines whether the installed amounts of all the TIERs are positive values or not.

If the result of the determination at the step 4356 is negative (that is, if any of the installed amounts is equal to or smaller than zero), at the step 4357, the program 2620 determines not to apply the relevant set of (A, B), removes the record comprising the relevant set of (A, B) from the installation pattern maintenance table 2650, and returns to the step 4353.

Meanwhile, if the result of the determination at the step 4356 is positive, the step 4358 is performed. Note that, at the step 4358, if the installation pattern maintenance table 2650 is created excluding the cases where the installed amount is a negative value, the processing at the steps 4355 and 4346 is not required.

Then, at the step 4358, the program 2620 makes the display (2) program 2630 display the GUI comprising the installed amount of each TIER calculated by the processing shown in FIG. 24 and FIG. 25. Note that, at the step 4358, instead of or in addition to displaying the installed amount of each TIER, the program 2620 may also perform the processing of automatically adding unused logical volumes in the storage apparatus 1000 to the media corresponding to the types of the logical volumes.

<Display Example>

Figure 26:
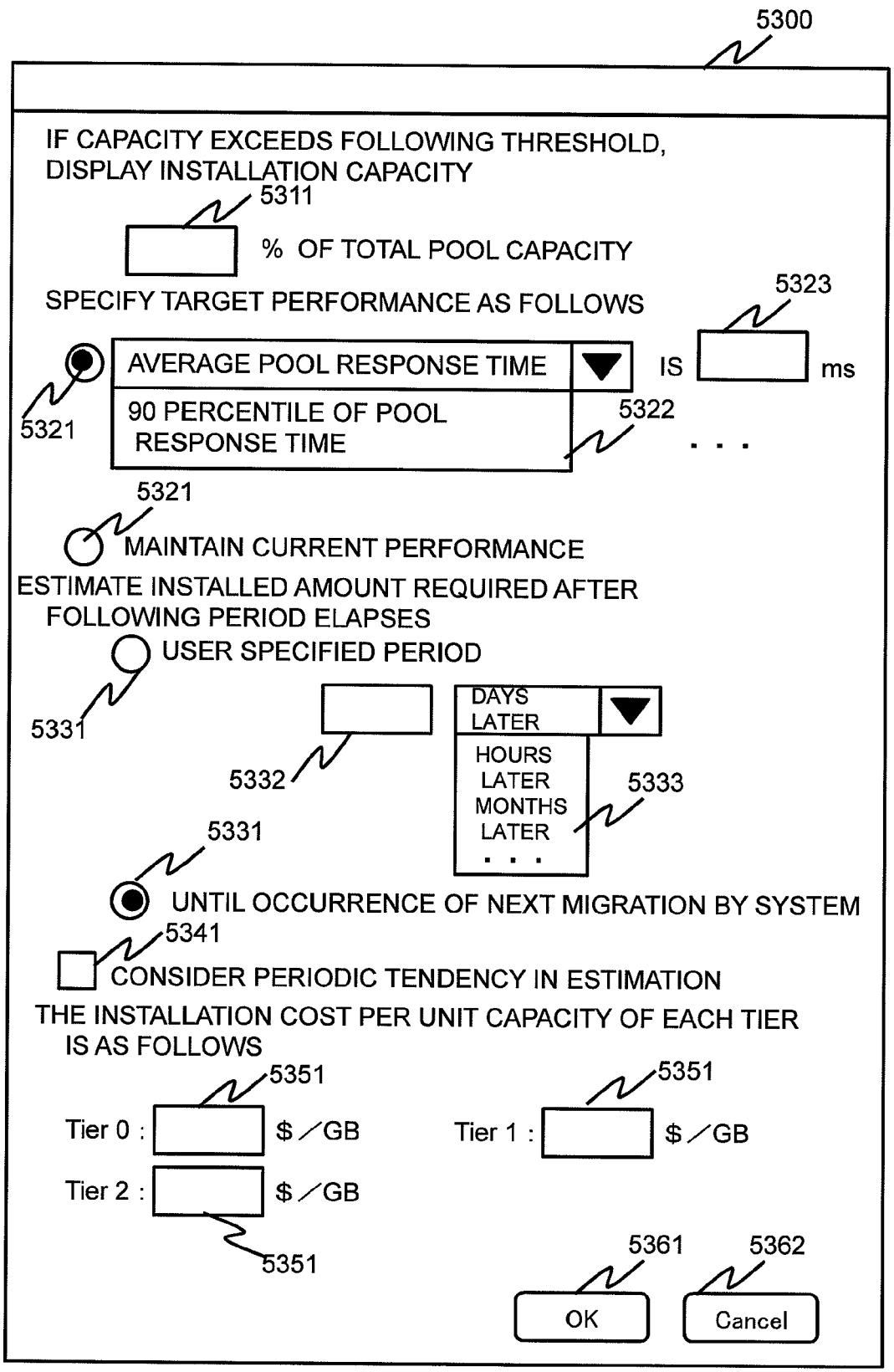
FIG. 26 shows an example of a GUI 5300 displayed at the step 4310 in FIG. 23.

FIG. 26 shows an example of a GUI 5300 displayed by the display (2) program 2630 at the step 4310 in FIG. 23.

The GUI 5300 comprises a text box 5311 for inputting the capacity threshold Th1, a combo box 5322 for selecting the type of the target performance to be monitored as the target performance Th2, and a text box 5323 for inputting the value. In addition, [the GUI 5300] may also comprise a radio button 5321 for selecting whether to specify the target performance directly or make the maintenance of the current performance the target performance. At this point, options for the target performance 5122 are, an average response time of the entire pool, a percentile value, and others. In addition, the GUI 5300, for inputting the estimation period T, comprises a text box 5332 and a combo box 5333 for selecting the unit of period. [The GUI 5300] may also comprise a radio button 5331 for selecting whether the user inputs [the values] directly or uses the value of an appropriate period which the system comprises, for example, the interval of segment migration. As well as the above, [the GUI 5300] may also comprise a check box 5341 for selecting whether to add a periodic estimation to the estimation or not and a text box for specifying an estimation period. Then, [the GUI 5300] comprises a text box 5351 for specifying the installation cost C of each TIER. The input unit may be, other than the installation cost, the amount of power consumption and others. Furthermore, [the GUI 5300] may also comprise a button 5361 for entering the input, a button 5362 for cancelling the same and others.

FIG. 27 shows an example of a GUI 5400 displayed at the step 4358 in FIG. 25.

In addition to the display of the GUI 5200 shown in FIG. 17, in the Embodiment 2, a table 5221 displaying the assumed performance and the installation cost occurring due to an installation can be displayed. Note that the values displayed in the table 5221 can be displayed by referring to the installation pattern maintenance table 2650. As another display method, all the installation methods in the installation pattern maintenance table 2650, with the elements displayed by the table 5211 and the table 5221, at least the installed amount and the installation cost or the assumed performance of each TIER in one table, may also be displayed in descending order of installation costs or assumed performances.

Variation Example of Embodiment 2

Note that, at the step 4340 of the Embodiment 2, the installed amount is calculated with reference to the target performance and the installation cost. By making this possible to perform at an arbitrary timing desired by the administrator, the use cases described below may also be supported.

Firstly, when a target performance is specified by the administrator, the installed amount of each medium which satisfies the target performance may be displayed with the installation cost. The administrator, by repeating the specification of the target performance and the display of the calculated installation cost, can acquire the installed amount of each medium (TIER) which satisfies both the target performance and the installation cost.

Secondly, by the administrator specifying an installation cost required for an installation, the installed amount of each medium satisfying the specified installation cost and the assumed performance in that case can be estimated. By this method, the administrator can acquire the installed amount of each medium which can be achieved within the desired installation cost and the performance in that case.

The step 4340 of the Embodiment 2 can be considered as an optimization problem that, the installed amount of each TIER whose installation cost is the lowest within the limitation satisfying the given target performance is determined. That is, [the problem] can be rewritten into the problem below. It is assumed that n[x] is the number of segments when the IOPS is x, that the parameter A is the IOPS which is the border of the TIER 1 and the TIER 2, and that the parameter B is the IOPS which is the border of the TIER 0 and the TIER 1. Furthermore, it is assumed that the constant values C0, C1, and C2 are the installation costs when installing unit capacities of the TIER 0, the TIER 1, and the TIER 2 respectively, that the constant values r0, r1, and r2 are the assumed response time of the TIER 0, the TIER 1, and the TIER 2 respectively, that the variables J0, J1, and J2 are the capacities of the TIER 0, the TIER 1, and the TIER 2 respectively before an installation, and that the variable r is the target performance set by the user. The target function (cost) complies with a number 1 below and the limitation complies with a number 2 and a number 3 below.

$$C0 \times \left(\sum_{x>\beta} n[x] - \Delta 0\right) + C1 \times \left(\sum_{\alpha \le x \le \beta} n[x] - \Delta 1\right) +$$
$$C2 \times \left(\sum_{x<\alpha} n[x] - \Delta 2\right) \rightarrow \text{Minimum}$$

Number 1

$$r0 \times \sum_{x>\beta} (x \times n[x]) +$$
$$r1 \times \sum_{\alpha \le x \le \beta} (x \times n[x]) + C2 \times \left(\sum_{x<\alpha} x \times n[x]\right) \le r$$

Number 2

$$\left(\sum_{x>\beta} n[x] - \Delta 0\right) \ge 0$$
and
$$\left(\sum_{\alpha \le x \le \beta} n[x] - \Delta 1\right) \ge 0$$
and
$$\left(\sum_{x<\alpha} n[x] - \Delta 2\right) \ge 0$$

Number 3

The above-mentioned problem can be considered as an optimization problem with the parameters A and B as variables. If the number of TIERs increases, the number of parameters also increases. As the above-mentioned problem is a non-linear convex programming problem, other than the method described with reference to FIG. 24 and FIG. 25, for example, the method below can be used. If n[x] can approximate differentiable function, the calculation can be performed by a penalty method or a sequential quadratic programming method. Meanwhile, even if n[x] cannot approximate differentiable function, efficient calculation by using various types of methods studied about the Discrete Programming Problem might be possible. Note that the above-mentioned solutions for the problems do not limit the technical scope of this invention.

Furthermore, though the Embodiment 1 and the Embodiment 2 describe [cases with] a single pool, if multiple sub-pools exist in the pool, to each of those sub-pools, the technology complying with the Embodiment 1 and the Embodiment 2 may be applied. At this point, a "sub-pool" is a grouped pool volume in the pool. For example, for limiting the pool volume used by the identified VVOL, the VVOL and the sub-pool are made to correspond to each other, and a segment is allocated from the sub-pool to the identified VVOL.

Embodiment 3

The Embodiment 3 of this invention is described below. At this point, the differences from the Embodiment 1 and/or the Embodiment 2 are mainly described while the description of what is common to the Embodiment 1 and/or the Embodiment 2 is omitted or simplified.
<Overview>
The Embodiment 1 and the Embodiment 2, considering the access frequency (IOPS) of a segment, describe appropriate installation methods for each TIER. In the Embodiment 3, if the assumed performance described in the Embodiment 2 is higher than the target performance (e.g. if an excessive number of high-performance TIERs exist), the capacity of a high-performance medium is removed from the pool while the target performance is achieved, and the capacity is used for other usages. By this method, as an entire storage apparatus, the storage area can be efficiently utilized. Note that the hardware configuration of the Embodiment 3 is the same as the Embodiment 2.
<Description of Processing>
The processing performed in the Embodiment 3 is only different at the step 4356 and later from the processing performed in the Embodiment 2. Therefore, with reference to FIG. 28, the processing at the step 4356 and later is described.

The program 2620, if the installed amount of the TIER X (X=0, 1, . . . ) calculated at the step 4356 is a positive value, determines that the TIER X requires an installation (step 4371). Meanwhile, if the installed amount of the TIER X is equal to or smaller than zero, at the step 4372, the program 2620 determines that removal can be performed for the TIER X, and assumes the removed amount of the TIER X to be the absolute value of the installed amount of the TIER X. After performing the above-mentioned processing for each TIER, at the step 4373, the program 2620 makes the display (2) program 2630 display the GUI comprising the result. Note that, at the step 4373, instead of or in addition to displaying the GUI comprising the result, installation and removal of logical volumes may be performed automatically.

Figure 28:
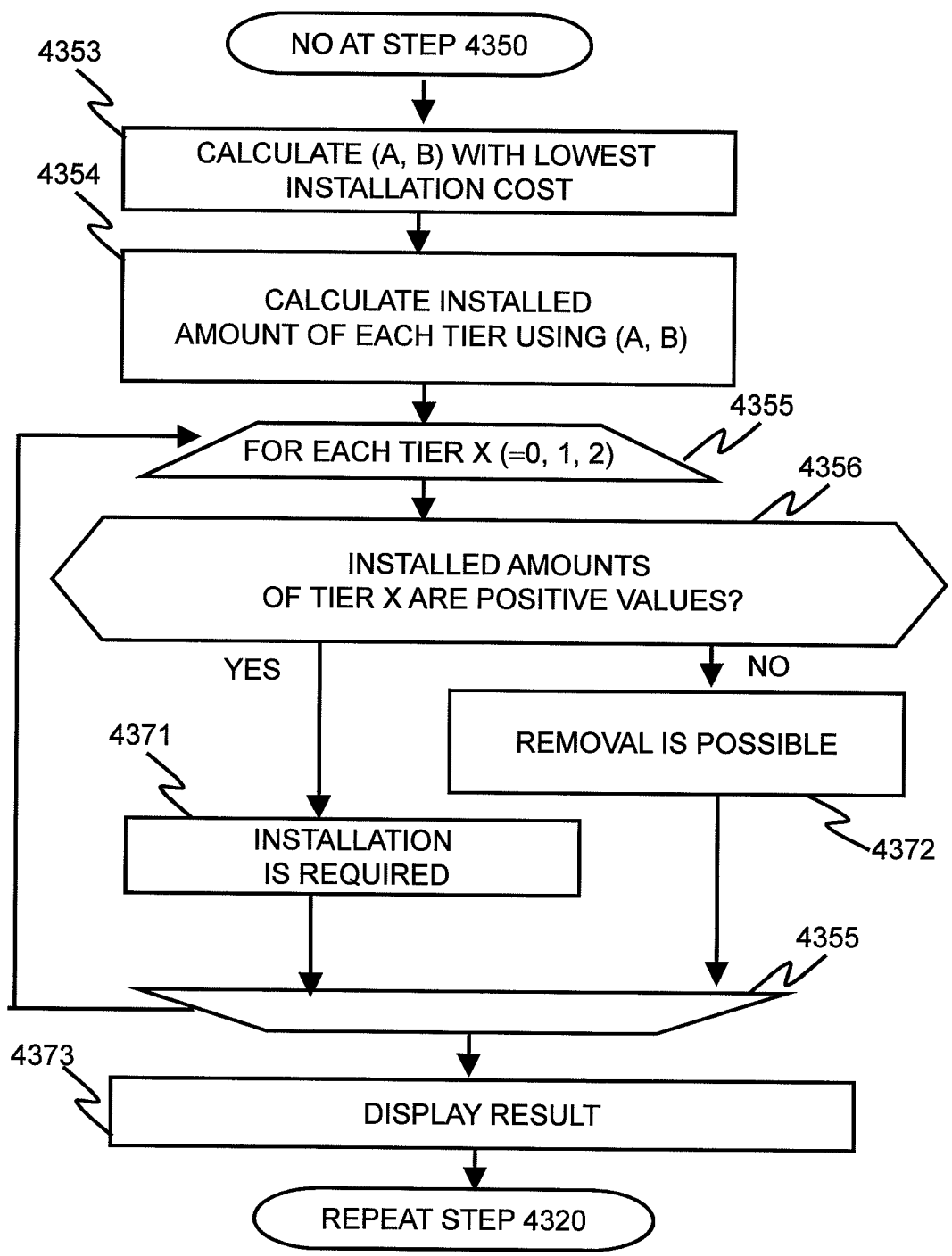
FIG. 28 shows a flowchart of a part of the processing of a capacity estimation (2) program 2620 related to the Embodiment 3.

FIG. 29 shows an example of a GUI 5500 displayed at the step 4373 in FIG. 28.

The GUI 5500, in addition to a table 5511 displaying the installed amount, displays a table 5521 displaying the removed amount. In addition, the table 5531 showing the assumed performance in that case is also displayed. Note that, same as the Embodiment 2, the installation cost may be stated together with the assumed performance.

Embodiment 4

Figure 30:
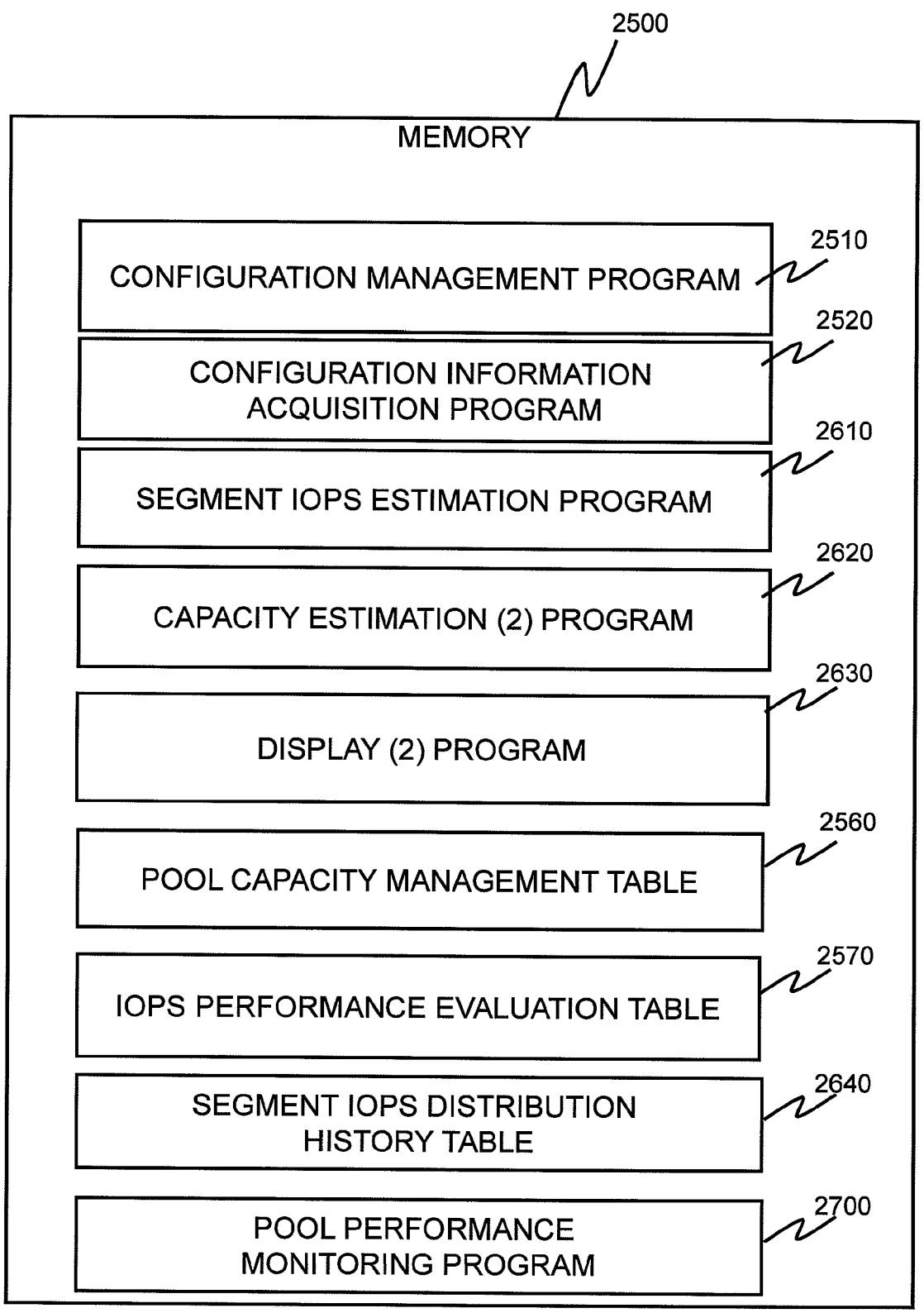
FIG. 30 shows programs and information stored in a memory 2500 in the management computer 2000 related to the Embodiment 4.

<Overview>
In the Embodiments from 1 to 3, installed amounts are calculated. As the installed amounts are values based on the estimated used capacities, even performing an installation complying with an installed amount calculated in the Embodiments from 1 to 3 is not completely free from the possibility of performance deterioration or insufficient capacity. Therefore, in the Embodiment 4, cause analysis for cases where performance deterioration or insufficient capacity occurs after performing an installation complying with an installed amount calculated in the Embodiments from 1 to 3 is performed.
<Description of Configuration>
The hardware configuration is the same as the Embodiment 1 or the Embodiment 2. The programs included in the memory 2500 in the management computer 2000 are different. As more specifically described, as shown in FIG. 30, in the Embodiment 4, a pool performance monitoring program 2700 exists in the memory 2500. Note that the pool performance monitoring program 2700 may also exist in the memory 2500 of the Embodiment 1 or the Embodiment 3.
<Description of Processing>
FIG. 31 shows a flowchart of the processing of the pool performance monitoring program 2700.

Figure 31:
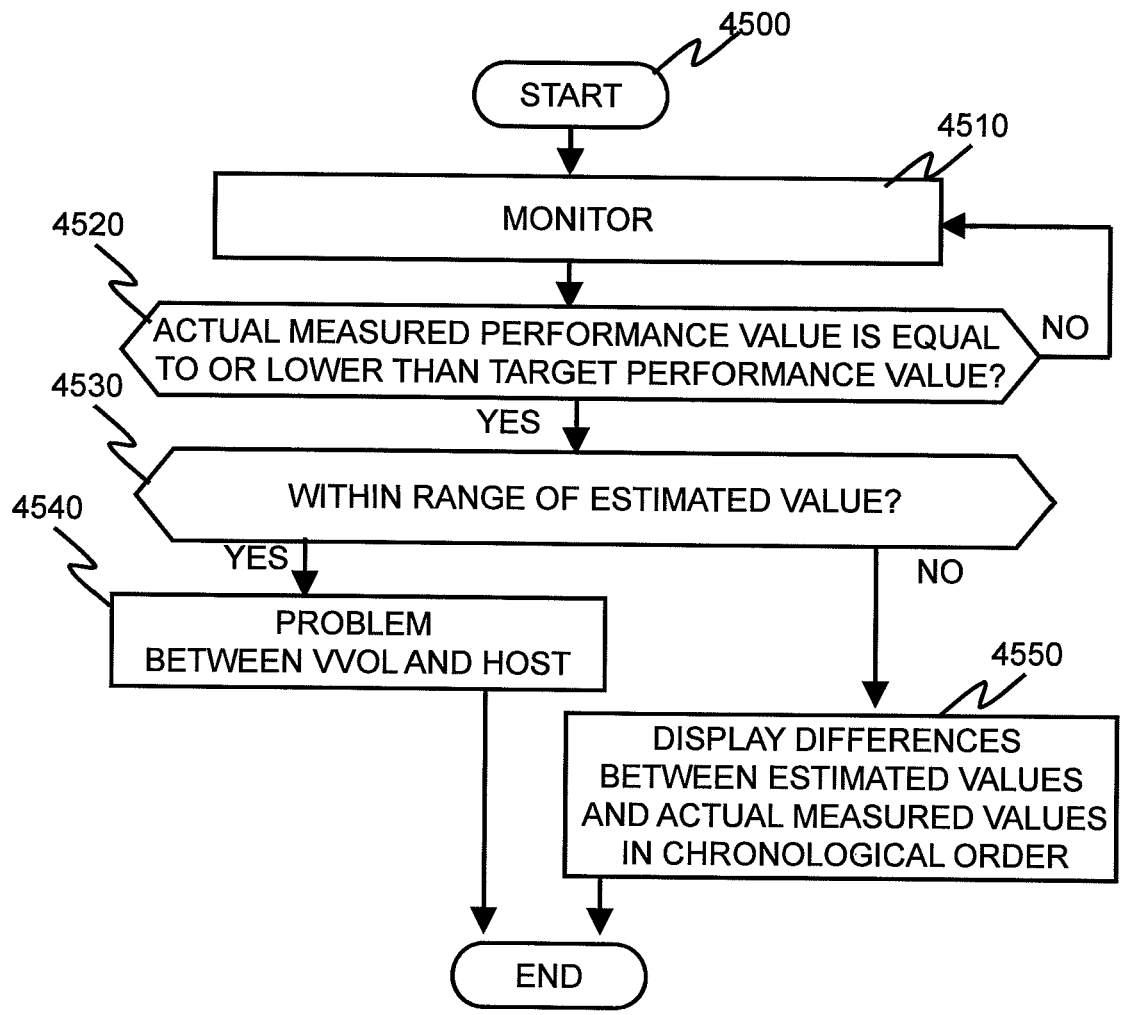
FIG. 31 shows a flowchart of the processing of a pool performance monitoring program 2700.

FIG. 31 gives an example of performance monitoring. By considering the "capacity" instead of the "performance," [the figure] can also be applied to capacity monitoring. Note that the Embodiment 4, as described above, assumes that an installation of the capacity was performed by the methods described in the Embodiments from 1 to 3. By starting the above-mentioned capacity estimation program or at the time specified by the administrator (that is, at an arbitrary timing), the processing is started.

At the step 4510, the pool performance monitoring program 2700, using the configuration information acquisition program 2520, acquires the actual measured performance value of the pool in the storage apparatus 1000. The "actual measured performance value" referred to herein, which is the same index as the target performance value described later, can be calculated using the actual measured response time value for IO to each segment in the pool and the actual measured response time value for IO to the VVOL provided to the host computer.

At the step 4520, the program 2700 compares the above-mentioned actual measured performance value acquired at the step 4510 with the target performance specified at the step 4310 and others and, if the actual measured performance value is lower than the target performance (e.g. if the response time is longer than the target response time), proceeds to the step 4530. If the actual measured performance value is equal to or higher than the target performance, [the program] returns to the step 4510 and continues monitoring.

At the step 4530, the program 2700, using the configuration information acquisition program 2520, acquires the IOPS of each segment in the current pool from the virtual volume management table 1570. Then, the program 2700 compares the segment IOPS distribution history table 2640 in which the estimation result is stored with the number of segments of each IOPS calculated from the above-mentioned acquired current pool. After the comparison, if the number of segments of each IOPS calculated from the current pool is larger than the estimated number of segments of each IOPS 2645 in the segment IOPS distribution history table 2640, the step 4550 is performed. Otherwise, [the result is] determined to be within the range of the estimation, and the step 4540 is performed.

That the step 4540 is performed indicates that the increase of the number of segments is within the range of the estimation or that the performance is deteriorated. Therefore, at the step 4540, the program 2700 displays the information showing that a cause exists between the pool and the host computer 3000 (and notifies the information to the administrator). In other cases, if the management computer 2000 comprises a program (not shown in the figure) of analyzing the status of the pool and the host computer 3000, the program 2700 may also run the analysis program and make the analysis program continue the cause analysis processing.

Meanwhile, that the step 4540 is performed indicates the larger increase of the IOPS or the number of segments than the estimated value. Therefore, the program 2700 displays the GUI comprising the result.

Figure 32:
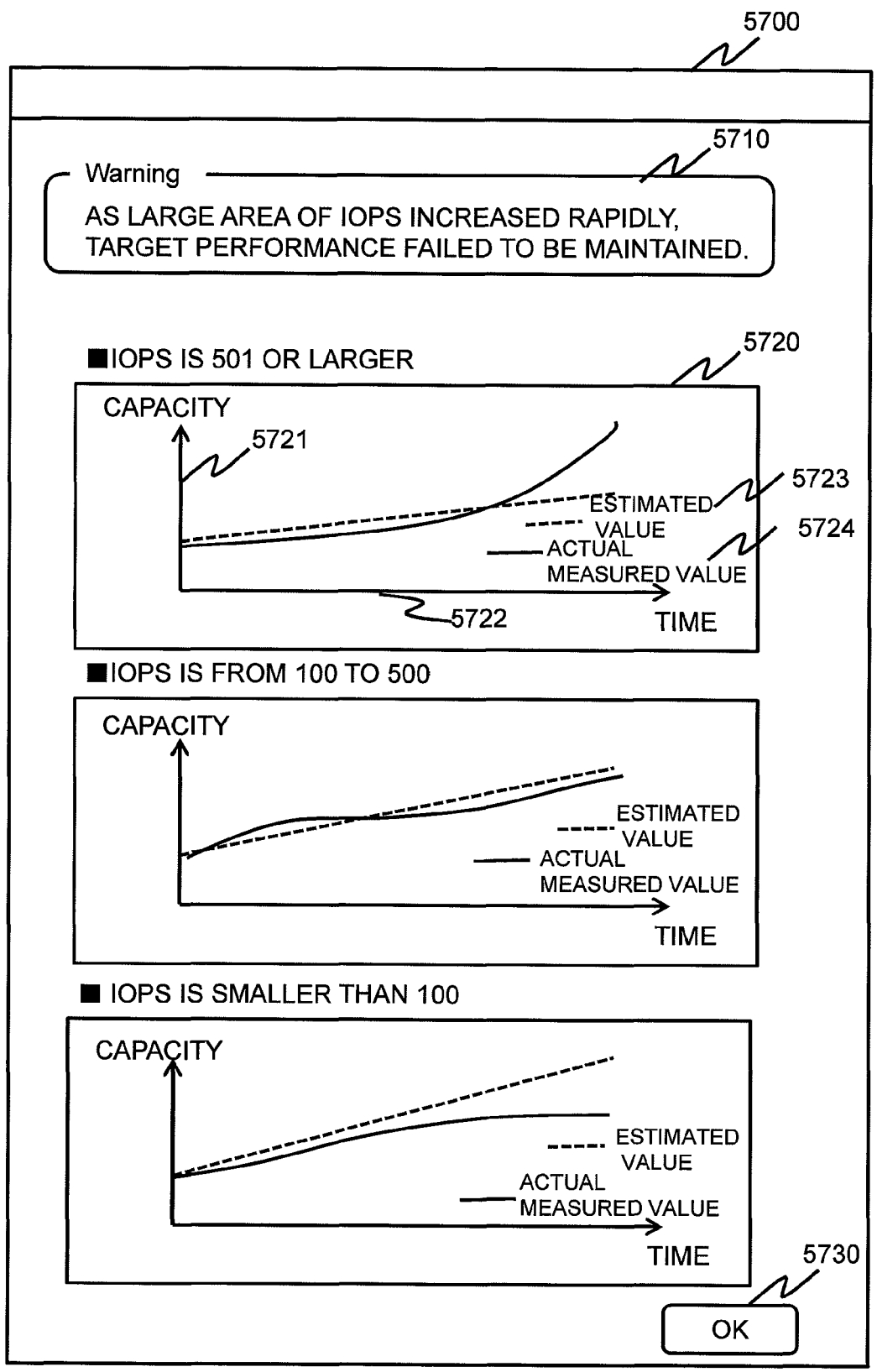
FIG. 32 shows an example of a GUI 5700 displayed at the step 4550 in FIG. 31.

FIG. 32 shows an example of a GUI 5700 displayed at the step 4550 in FIG. 31.

The GUI 5700 comprises a text 5710 showing the analysis result described at the step 4550 and graphs 5720 showing differences between an estimated value line 5723 and an actual measured value curve 5724. As for the graphs 5720, the horizontal axis 5722 shows the time while the vertical axis 5721 shows the capacity. Note that the capacity of the horizontal axis 5721 may also be the number of segments. Furthermore, the graphs 5720, instead of showing the number of segments of each IOPS, can show [the number of segments] by the part of IOPS determined at the step 4530 to be beyond the range [of the estimation] or in units of acceptable IOPS ranges 2573 of the IOPS performance evaluation table 2570.

[The GUI 5700] may also comprise a button 5730 which the administrator clicks after confirmation.

Embodiment 5

<Overview>

While, in the Embodiments from 1 to 4, capacity estimation for each TIER of the pool is performed in the management computer 2000, the capacity estimation processing is performed in the storage apparatus 1000 in the Embodiment 5 of this invention.

<Description of Configuration>

The hardware configuration of the Embodiment 5 is the same as the configuration shown in FIG. 1.

Figure 33:
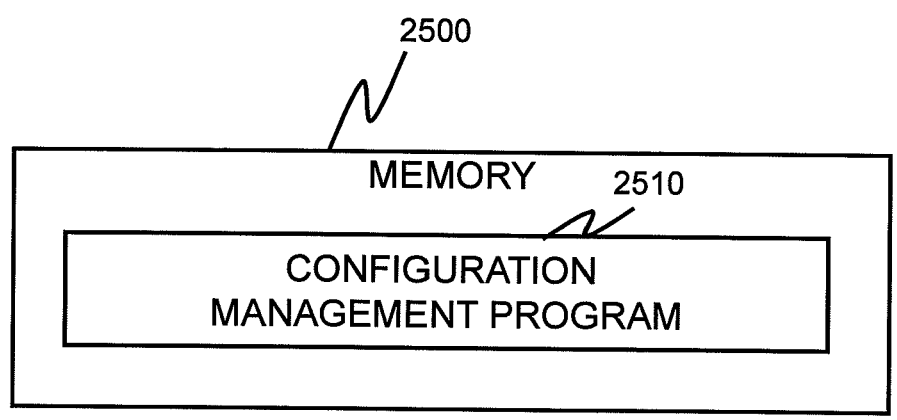
FIG. 33 shows a program and information stored in a memory 2500 in the management computer 2000 related to the Embodiment 5.

FIG. 33 shows the program and information stored in the memory 2500 in the management computer 2000.

In the Embodiment 5, as respective types of processing are performed by the storage apparatus 1000, as a program, the memory 2500 only has to comprise the above-mentioned configuration management program 2510. In addition, the display (1) program 2550 or the display (2) program 2630 described in the Embodiment 1 and the Embodiment 2 may also be included. Furthermore, if the storage apparatus 1000 comprises any functions comprising the management computer 2000 related to at least one of the Embodiments from 1 to 4, the management computer 2000 does not have to exist.

Figure 34:
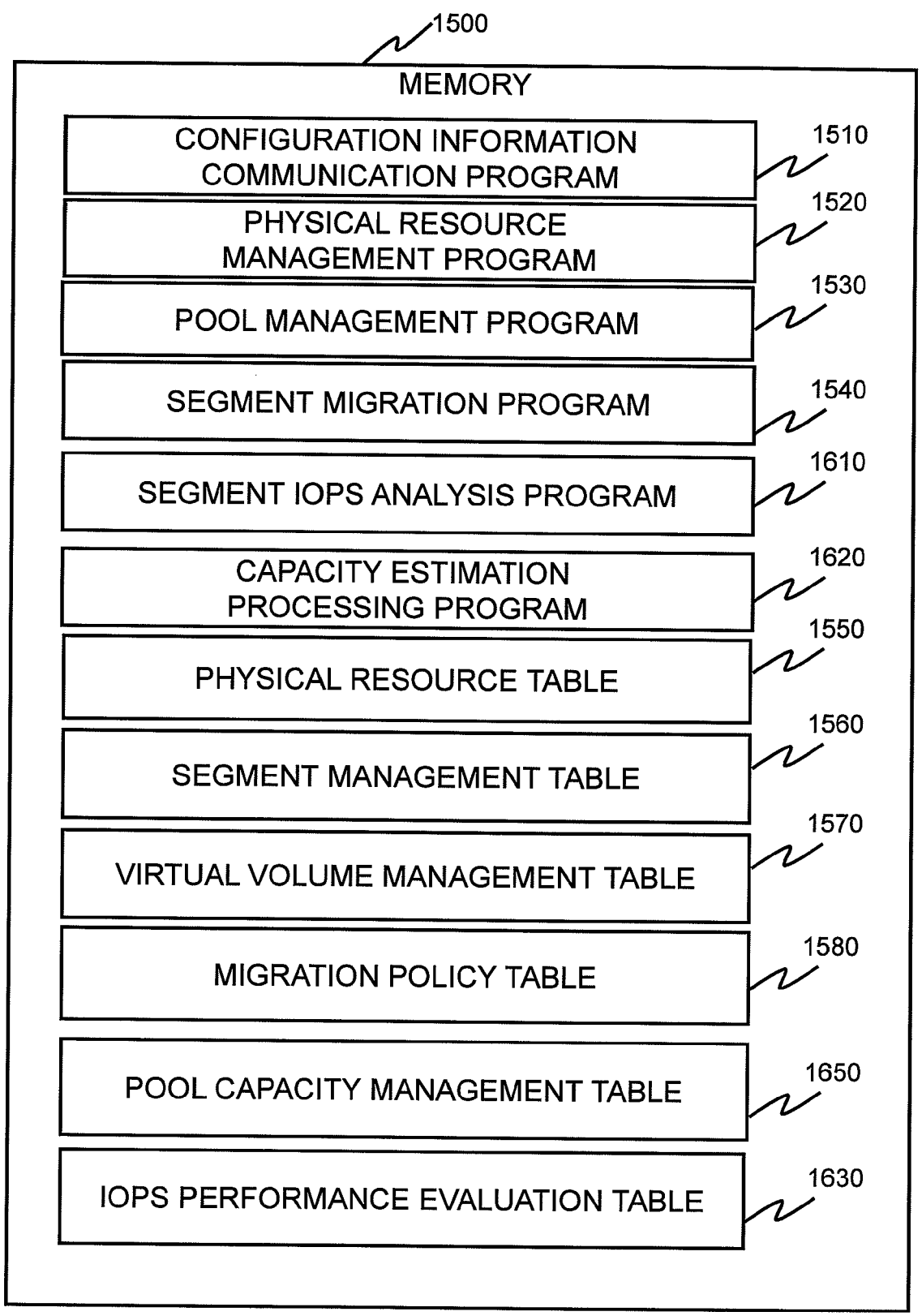
FIG. 34 shows programs and information stored in a memory 1500 in the storage apparatus 1000 related to the Embodiment 5.

FIG. 34 shows the programs and information stored in the memory 1500 in the storage apparatus 1000.

In the Embodiment 5, a segment IOPS analysis program 1610, a capacity estimation program 1620, an IOPS performance evaluation table 1630, a segment IOPS history table 1640, and a pool capacity management table 1650 are stored in the memory 1500. Among these, the IOPS performance evaluation table 1630 is the same as the IOPS performance evaluation table 2570 described in the Embodiment 1 or the Embodiment 2. Furthermore, the pool capacity management table 1650 is not a mandatory table as the table can be calculated from the segment management table 1560.

For the storage apparatus 1000 to perform the same capacity estimation processing as the processing performed by the management computer 2000 in the Embodiment 1, for example, the segment IOPS analysis program 1610 must be the same program as the segment IO evaluation program 2530, the capacity estimation program 1620 must be the same program as the capacity estimation (1) program 2540, and the segment IOPS history table 1640 must be the same table as the capacity transition history table 2580.

Meanwhile, for the storage apparatus 1000 to perform the same capacity estimation processing as the processing performed by the management computer 2000 in the Embodiment 2, the segment IOPS analysis program 1610 must be the same program as the segment IOPS estimation program 2610, the capacity estimation program 1620 must be the same program as the capacity estimation (2) program 2620, and the segment IOPS history table 1640 must be the same table as the segment IOPS distribution history table 2640.

However, as for the capacity estimation program 1620, in the flowchart of the capacity estimation (1) program or the capacity estimation (2) program, by changing the input method in the processing of requiring the administrator for the input to the input method which the storage apparatus comprises, or by maintaining the initial values, the input of the initial values may be made unnecessary. Furthermore, the notification of the calculated result of installation may also be changed to the output method which the storage apparatus comprises.

Embodiment 6

<Overview>

As the Embodiment 6 of this invention, a method for estimating the capacity at the time of an installation in case where the host computer comprises a pool.

<Description of Configuration>

Figure 35:
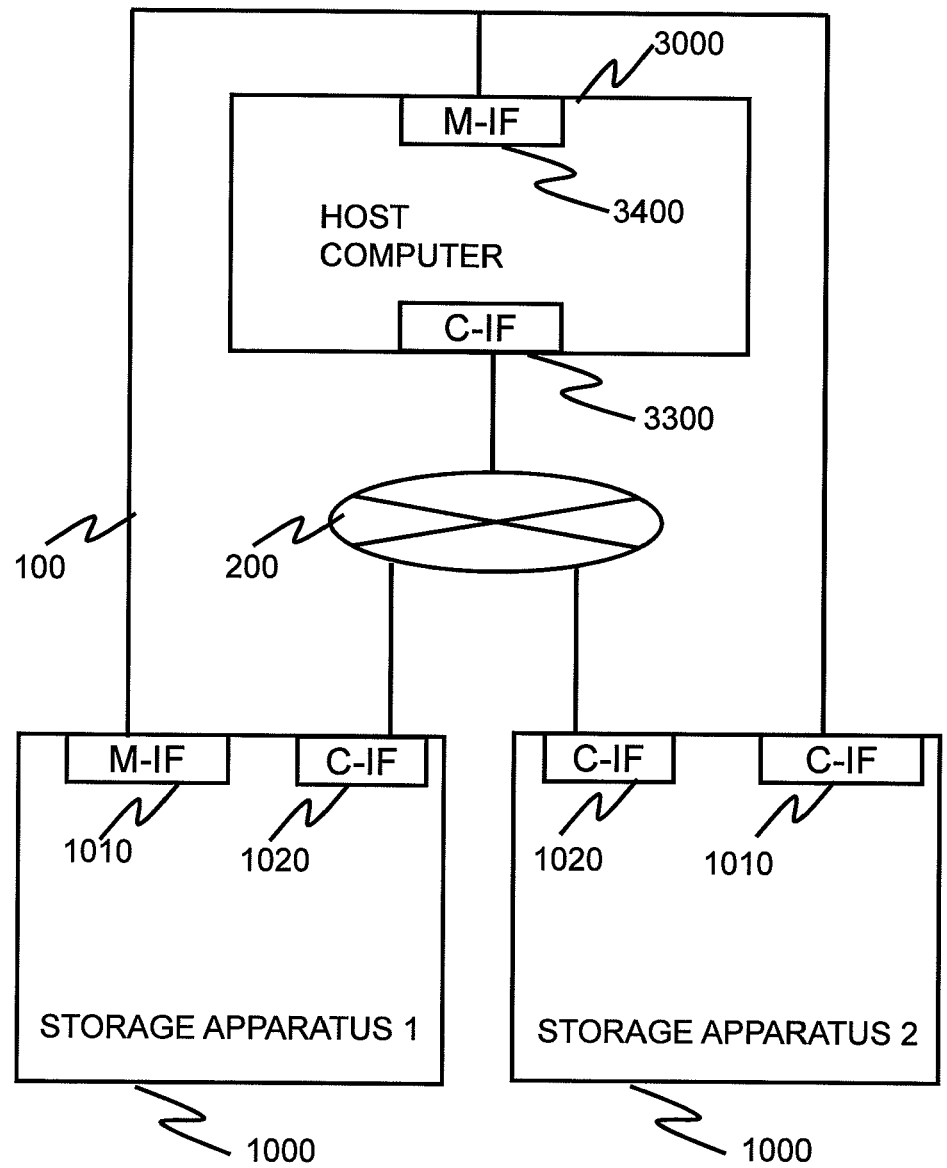
FIG. 35 shows a storage system related to the Embodiment 6 of this invention.

FIG. 35 shows the storage system related to the Embodiment 6 of this invention.

The management IFs 1010 of the storage apparatus 1 and the storage apparatus 2 are coupled to the management IF 3400 of the host computer 3000 via the data network 100. Meanwhile, the ports 1020 of the storage apparatus 1 and the storage apparatus 2 are coupled to the communication IF 3300 of the host computer 3000 via the data network 200. At this point, the storage apparatus 1 and the storage apparatus 2 coupled to the host computer 3000 only provide the storage areas which the respective apparatuses comprise to the host computer, and the number of storage apparatuses may be an arbitrary number of 0 or larger. Furthermore, if the host computer 3000 itself does not comprise the pool management function which is described later, a management computer for managing the pool and the storage areas may also exist.

Figure 36:
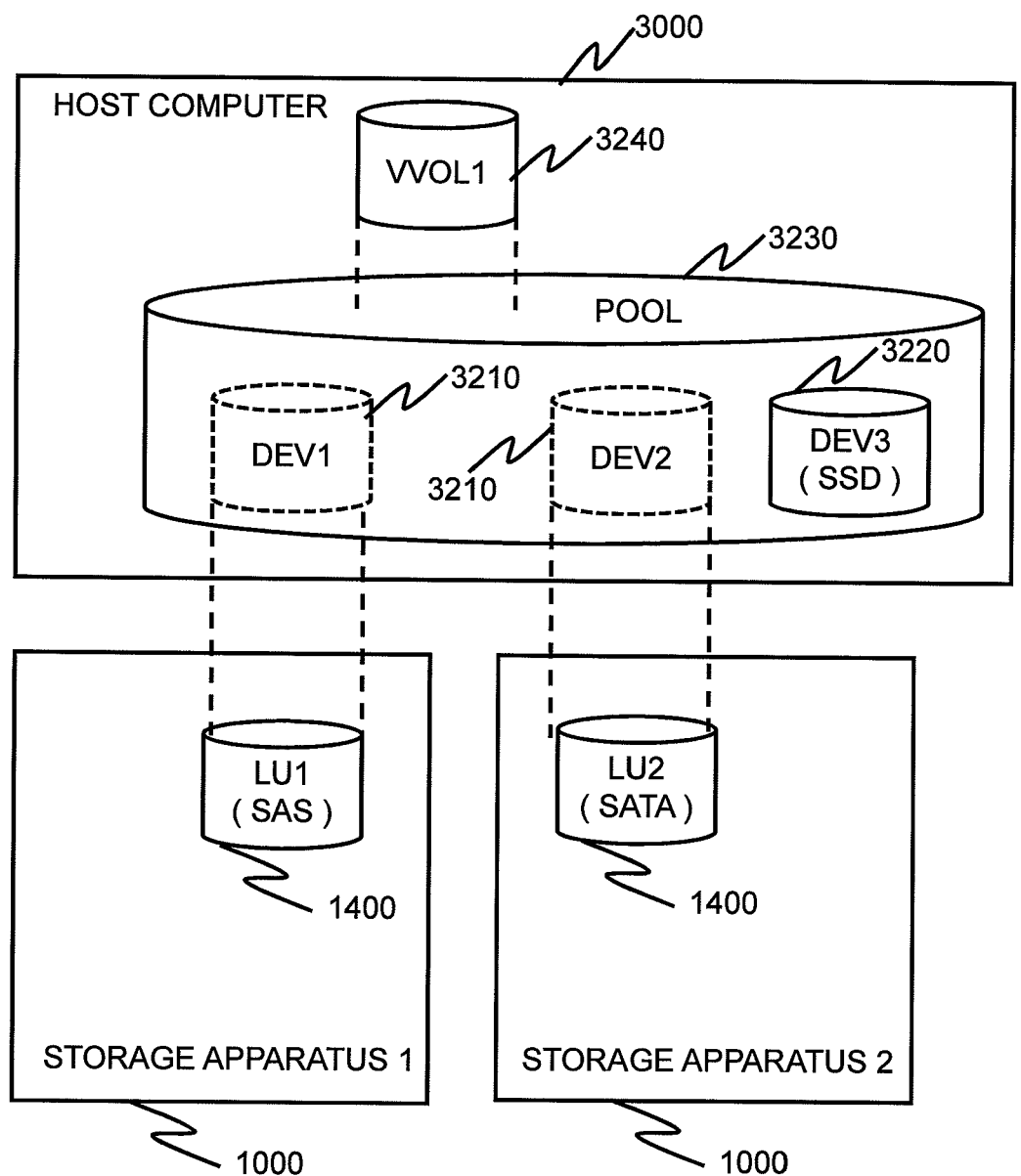
FIG. 36 shows the concept of pool management related to the Embodiment 6.

FIG. 36 shows the concept of pool management related to the Embodiment 6.

The host computer 3000 recognizes the storage area 1400 (LU1 in the figure) provided by the storage apparatus 1 and the storage area 1400 (LU2 in the figure) provided by the storage apparatus 2 as volumes 3210 (DEV1 and DEV2 in the figure) of the host computer 3000. Furthermore, the disk 3200 which the host computer 3000 comprises may also be recognized as a volume 3220 (DEV3 in the figure). The host computer 3000 manages these volumes 3210 and the pool 3230 configured of the volumes 3220, and provides the VVOL 3240 made to correspond to the pool 3230 to the operation program 3510 and others. Furthermore, in the pool 3230, in addition to the volumes, free areas of the memory 3500 and others may also be included. To this type of pool 3230, this invention can be applied.

Figure 37:
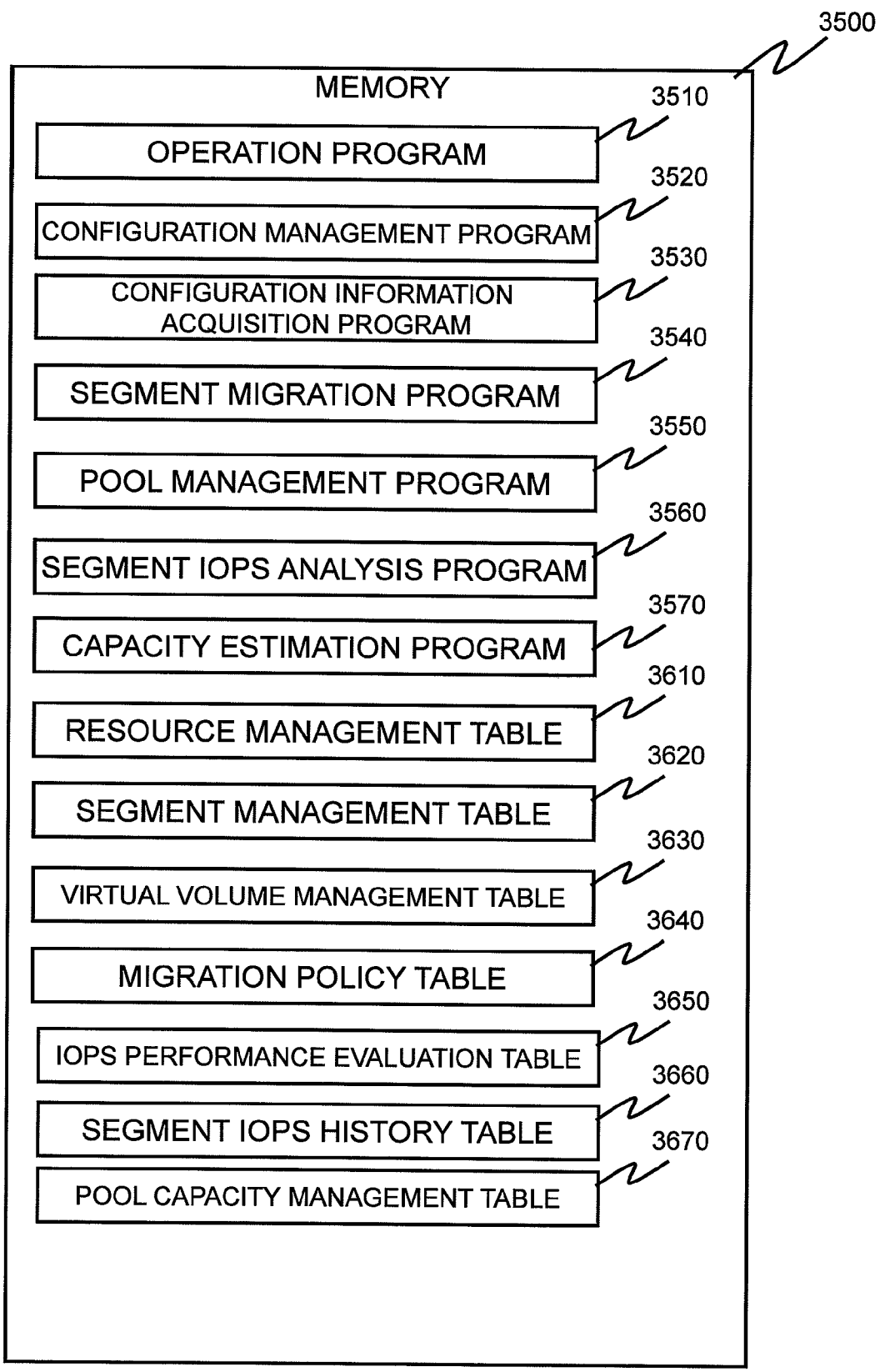
FIG. 37 shows programs and information stored in a memory 3500 in the host computer 3000 related to the Embodiment 6.

FIG. 37 shows the programs and information stored in the memory 3500 in the host computer 3000 related to the Embodiment 6.

The configuration management program 3520 is the same as the configuration management program 2510 which the management computer 2000 comprises in the Embodiment 1, and the configuration information acquisition program 3530 is the same as the configuration information acquisition program 2520 which the management computer 2000 comprises in the Embodiment 1.

Furthermore, the segment migration program 3540 is the same as the segment migration program 1540 which the storage apparatus 1000 comprises in the Embodiment 1, and the pool management program 3550 is the same as the pool management program which the storage apparatus 1000 comprises in the Embodiment 1.

The segment IOPS analysis program 3560 is the same as the segment IOPS analysis program 1610 described in the Embodiment 5 which the storage apparatus 1000 comprises, and the capacity estimation program 3570 is the same as the capacity estimation program 1620 described in the Embodiment 5 which the storage apparatus 1000 comprises, and is the program which makes any of the estimation methods described in the Embodiment 1 and the Embodiment 2 possible.

The resource management table 3610 is the table for managing the volumes recognized by the host computer 3000.

Figure 38:
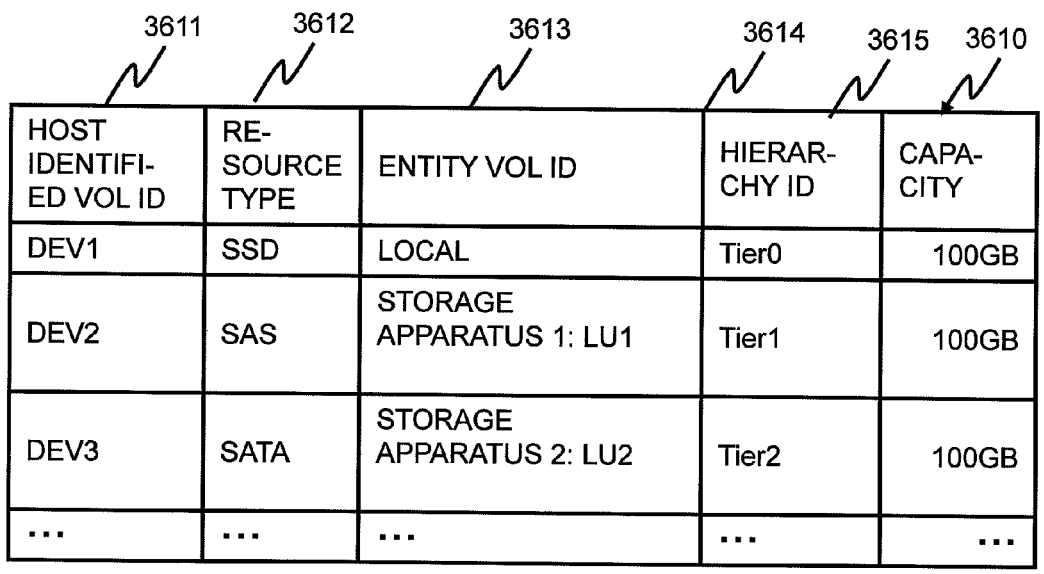
FIG. 38 shows an example of a resource management table 3610.

FIG. 38 shows an example of the resource management table 3610.

The resource management table 3610 comprises the information related to the volumes recognized by the host computer 3000. As more specifically described, the table 3610, for each volume recognized by the host computer 3000, comprises the information described below, a VOL ID 3611 which is the ID of a volume, a resource type 3612 showing the type of the volume, an entity VOL ID 3613 showing where an entity of the volume exists, a hierarchy ID 3614 which is the ID of the hierarchy to which the volume belongs, and a capacity 3615 showing the storage capacity of the volume.

The resource type 3612, the hierarchy ID 3614, and the capacity 3615 indicate the same as in the Embodiment 1 and others. For example, as a volume recognized by the host, a host recognized VOL ID: DEV1 can be determined as the volume existing locally, that is, in the host computer 3000. Meanwhile, a host recognized VOL ID: DEV2 can be determined to be an LU1 whose entity exists in the storage apparatus 1. Furthermore, by setting the hierarchy ID 3612, in addition to the resource type 3612, including delay time depending on whether [the volume] exists in the host computer or not and others, the estimation accuracy can be expected to be improved. As more specifically described, for example, even if the physical storage device based on the volume is an SAS, depending on whether delay time is long or short, two or more hierarchies may also exist separately.

The segment management table 3620 is the same as the segment management table 1560 which the storage apparatus 1000 comprises in the Embodiment 1, the virtual volume management table 3630 is the same as the virtual volume management table 1570, the migration policy table 3640 is the same as the migration policy table 1580, and the IOPS performance evaluation table 3650 is the same as the IOPS performance evaluation table 1630. Meanwhile, the segment IOPS history table 3660 is the same as the segment IOPS history table 1640 described in the Embodiment 5 which the storage apparatus 1000 comprises, and the pool capacity management table 3670 is the same as the pool capacity management table 1650.

<Description of Processing>

The flow of each of the programs in the Embodiment 6 is the same as the flow of each of the programs described in the Embodiments [from 1] to 5. However, the GUI showing the result of the estimation performed by the capacity estimation program 3570 is different from the previously described [GUIs]. An example of the GUI is shown in FIG. 39.

In FIG. 39, the GUI 5800 is different about the table 5610 from the previously described GUI 5200 and others. In addition to the display of the installed amount, in this embodiment, the display of the installation destination 5611 is required. For example, if an installation of a high-performance volume is required, as an installation destination 5611, "local" may be displayed. This indicates that an installation is required for the host computer 3000. Meanwhile, if only an installation of low-performance volumes is required, as the installation destination 5611, "arbitrary" may be displayed. For considering the installation destination 5611, by maintaining the assumed response time 2574 with communication delay taken into consideration for each candidate installation destination or by performing the setting considering communication delay for the hierarchy ID, [the installation destination 5611] can be determined.

\<Variations\>

The storage apparatus 1000, by taking in volumes which a different storage apparatus from the storage apparatus 1000 comprises into the storage apparatus 1000, can handle the volumes of another storage apparatus as local volumes (hereinafter referred to as an external connection function). In the storage apparatus 1 of FIG. 35, the storage apparatus 1, by comprising the external connection function, can handle the volume of the storage apparatus 2 as the volume of the storage apparatus 1. The pool management technology and the capacity estimation technology and methods performed by the host computer of the Embodiment 6 may also be applied to the above-mentioned storage apparatus 1 comprising the external connection function. By this method, in the storage apparatus 1, to the pool of the storage apparatus 1 configured of multiple storage volumes, the capacity estimation technology can be provided. Furthermore, volumes recognized by the storage apparatus 1, not limited to other storage apparatuses, may also include the disk 3200 maintained by the host computer and the cache memory area.

Though the embodiments of this invention were described above, this invention is not limited to the embodiments herein disclosed and, it is obvious that this invention also comprises any changes, modifications or equivalents within the spirit and scope hereof.

For example, the configuration of the storage apparatus 1000, the management computer 2000, and the host computer 3000 does not have to be the configuration shown in FIG. 1.

Furthermore, as for the GUI for inputting the initial values or the GUI for notifying the estimated installed amount, the input tools are not limited to the input tools shown in the figures, and other types of tools may also be applied.

REFERENCE SIGN LIST

1000 Storage apparatus, 2000 Management computer, 3000 Host computer

The invention claimed is:

1. A management system for a storage apparatus coupled to a host device,
wherein the storage apparatus comprises:
a virtual volume, which is a virtual logical volume configured of multiple virtual areas;
a pool configured of multiple actual area groups of different performances related to I/O processing; and
a controller which, in response to an access command from the host device, accesses an actual area allocated to a virtual area identified by the access command,
wherein, if the access command from the host device is a write command, the controller allocates an actual area from the pool to a virtual area identified by the write command,
wherein the controller manages pool status information, which is information showing which actual area is allocated to which virtual area and a load of the access commands related to each of the virtual areas,
wherein the management system comprises:
a storage resource; and
a processor coupled to the storage resource,
wherein the storage resource stores capacity management information, which is information showing the current storage capacity of each actual area group, and
wherein the processor:
(A) estimates the used capacity of each actual area group at a point of time in the future based on the pool status information at multiple points of time from past to present and an access load threshold defining a range of access load for each actual area group;
(B) calculates, for each actual area group, an installed/removed amount which is a difference between the estimated used capacity and the current storage capacity shown by the capacity management information; and
(C) performs processing based on the result of the calculation in the (B),
wherein one or more access load thresholds are determined based on a pool performance which is a response time of the pool and an installation cost which is a financial cost at least one of for obtaining installing capacity and for consumed electricity.

2. A management system according to claim 1,
wherein in the (C), the processor displays either the following (c01) or (c02):
(c01) the installed/removed amount of each actual area group calculated in the (B); and
(c02) the pool performance and/or the installation cost for the pool.

3. A management system according to claim 2,
wherein, in the display of the (C), combinations of the installed/removed amounts of each actual area group are lined up in order of either the pool performance or the installation cost for the pool.

4. A management system according to claim 1,
wherein an assumed performance of the pool is calculated based on multiple expected access times corresponding to the multiple actual area groups and on the distribution, and
wherein the expected access time is a length of time expected to be required for an access to an actual area.

5. A management system according to claim 1,
wherein in the (A), the processor:
(a11) calculates, for each of the actual area groups at respective points of time, the used capacity which is the total storage capacity of the actual area allocated to the virtual area, based on the pool status information and the one or more access load thresholds, writes information showing a point of time and information showing the used capacity of each actual area group into the storage resource, whereby history information showing the used capacity of each actual area group at the multiple points of time is accumulated in the storage resource; and
(a12) estimates the used capacity of each actual area group at a point of time in the future based on the history information.

6. A management system according to claim 5,
wherein the controller migrates data in a first actual area in a first actual area group to a second actual area in a second actual area group that corresponds to the range of the access load of the first actual area, and allocates the second actual area instead of the first actual area to the virtual area to which the first actual area has been allocated, and
wherein the one or more access load thresholds are an upper limit and/or a lower limit of at least one of multiple range of access load corresponding to the multiple actual area groups.

7. A management system according to claim 1,
wherein the processor estimates the used capacity of each actual area group at the point of time in the future only when a prescribed event has occurred.

8. A management system according to claim 7,
wherein the prescribed event is the used capacity of the pool having exceeded a prescribed threshold.

9. A management system according to claim 7,
wherein the prescribed event is the pool performance having fallen below a target performance.

10. A management system according to claim 1,
wherein after the installation and/or removal of storage capacity is performed for the pool, the processor:
(D) determines whether or not the pool performance, which is calculated based on the pool status information, has fallen below a target performance; and
(E) in a case where the result of the determination in the (D) is affirmative, displays information showing a cause of the pool performance having fallen below the target performance based on the size of the difference between the pool performance and the target performance.

11. A management system according to claim 1,
wherein in the (C), the processor performs either the following (c11) or (c12):
(c11) in a case where the installed amount has been calculated for a certain actual area group, automatically installs one or more actual areas having the same performance as the certain actual area group and having the total storage capacity equal to or greater than the installed amount; and
(c12) in a case where the removed amount has been calculated for a certain actual area group, automatically removes, from the certain actual area group, one or more actual areas having the total storage capacity equal to or less than the removed amount.

12. A management system according to claim 1,
wherein the processor estimates the used capacity for each of actual area group based on an amount of the actual areas, for each of actual area groups, which should be allocated to the virtual areas at the multiple points of time from past to present.

13. A management system according to claim 1,
wherein the processor estimates the used capacity for each of actual area group based on an amount of virtual areas for each of a certain range of the access load of the access commands at the multiple points of time from past to present.

14. A management method for a storage apparatus that is coupled to a host device and that includes: a virtual volume, which is a virtual logical volume configured of multiple virtual areas; a pool configured of multiple actual area groups of different performances related to I/O processing; and a controller which, in response to an access command from the host device, accesses an actual area allocated to a virtual area identified by the access command, the controller, if the access command from the host device is a write command, allocates an actual area from the pool to a virtual area identified by the write command, the controller managing pool status information, which is information showing which actual area is allocated to which virtual area and a load of the access commands related to each of the virtual areas,
the management method comprising:
(A) estimating the used capacity of each actual area group at a point of time in the future based on the pool status information at multiple points of time from past to present and an access load threshold defining a range of access load for each actual area group,
(B) calculating, for each actual area group, an installed/removed amount which is the difference between the estimated used capacity and the current storage capacity, and
(C) performing processing based on the result of the calculation in the (B),
wherein one or more access load thresholds are determined based on a pool performance which is a response time of the pool and an installation cost which is a financial cost at least one of for obtaining installing capacity and for consumed electricity.

\* \* \* \* \*